US010451011B2

(12) United States Patent
Kikuchi

(10) Patent No.: US 10,451,011 B2
(45) Date of Patent: Oct. 22, 2019

(54) GAS SUPPLY DEVICE FOR INTERNAL COMBUSTION ENGINE AND CONTROL METHOD FOR THE SAME

(71) Applicant: TOYOTA JIDOSHA KABUSHIKI KAISHA, Toyota-shi, Aichi-ken (JP)

(72) Inventor: Kazuki Kikuchi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/970,452

(22) Filed: May 3, 2018

(65) Prior Publication Data

US 2018/0334997 A1    Nov. 22, 2018

(30) Foreign Application Priority Data

May 19, 2017   (JP) ................................ 2017-100114

(51) Int. Cl.
*F02M 25/12*   (2006.01)
*F02B 33/44*   (2006.01)
(Continued)

(52) U.S. Cl.
CPC ............. *F02M 25/12* (2013.01); *F02B 33/44* (2013.01); *F02B 47/06* (2013.01); *F02D 21/04* (2013.01);
(Continued)

(58) Field of Classification Search
CPC ......... F02M 25/12; F02B 33/44; F02B 47/06; F02D 21/04
See application file for complete search history.

(56) References Cited

U.S. PATENT DOCUMENTS 5,649,517 A * 7/1997 Poola .................... B01J 19/088
                                                        123/585
5,960,777 A * 10/1999 Nemser ................ B01D 53/228
                                                        123/26
(Continued)

FOREIGN PATENT DOCUMENTS

JP    S59-142461 U    9/1984
JP    H02-070968 A    3/1990
(Continued)

*Primary Examiner* — Kevin A Lathers
(74) *Attorney, Agent, or Firm* — Hunton Andrews Kurth LLP

(57) ABSTRACT

A gas supply device is equipped with an oxygen enrichment membrane module, a pump portion, and an electronic control unit. The electronic control unit performs oxygen enrichment control for merging the air supplied to a first space from a second space through the oxygen enrichment membrane and containing a higher concentration of oxygen than an atmosphere with the atmosphere that has flowed into the first space and supplying the merged air and atmosphere to a combustion chamber of the cylinders by driving the pump portion, and nitrogen enrichment control for discharging air containing a higher concentration of oxygen than the atmosphere to the second space from the first space through the oxygen enrichment membrane, producing air containing a higher concentration of nitrogen than the atmosphere in the first space, and supplying the air containing the higher concentration of nitrogen to the combustion chamber by driving the pump portion.

9 Claims, 14 Drawing Sheets

(51) Int. Cl.
   *F02B 47/06* (2006.01)
   *F02D 41/00* (2006.01)
   *F02M 35/10* (2006.01)
   *F02D 21/04* (2006.01)
   *F02D 41/14* (2006.01)

(52) U.S. Cl.
   CPC ..... *F02D 41/0007* (2013.01); *F02D 41/0025* (2013.01); *F02D 41/144* (2013.01); *F02D 41/1441* (2013.01); *F02D 41/1456* (2013.01); *F02D 41/1475* (2013.01); *F02M 35/10157* (2013.01); *F02D 2200/0406* (2013.01); *F02M 35/10255* (2013.01)

(56) References Cited

U.S. PATENT DOCUMENTS

| | | | |
|---|---|---|---|
| 6,453,893 B1* | 9/2002 | Coleman | F02M 25/12 |
| | | | 123/585 |
| 9,074,559 B2* | 7/2015 | Nemitallah | F02M 26/35 |
| 2005/0081800 A1* | 4/2005 | Davidson | B01D 53/22 |
| | | | 123/26 |
| 2013/0032123 A1 | 2/2013 | Kinugawa et al. | |
| 2016/0265492 A1 | 9/2016 | Powell et al. | |

FOREIGN PATENT DOCUMENTS

| | | |
|---|---|---|
| JP | 2007-113459 A | 5/2007 |
| JP | 2013-032708 A | 2/2013 |
| JP | 2016-166602 A | 9/2016 |

\* cited by examiner

<FIRST EMBODIMENT>

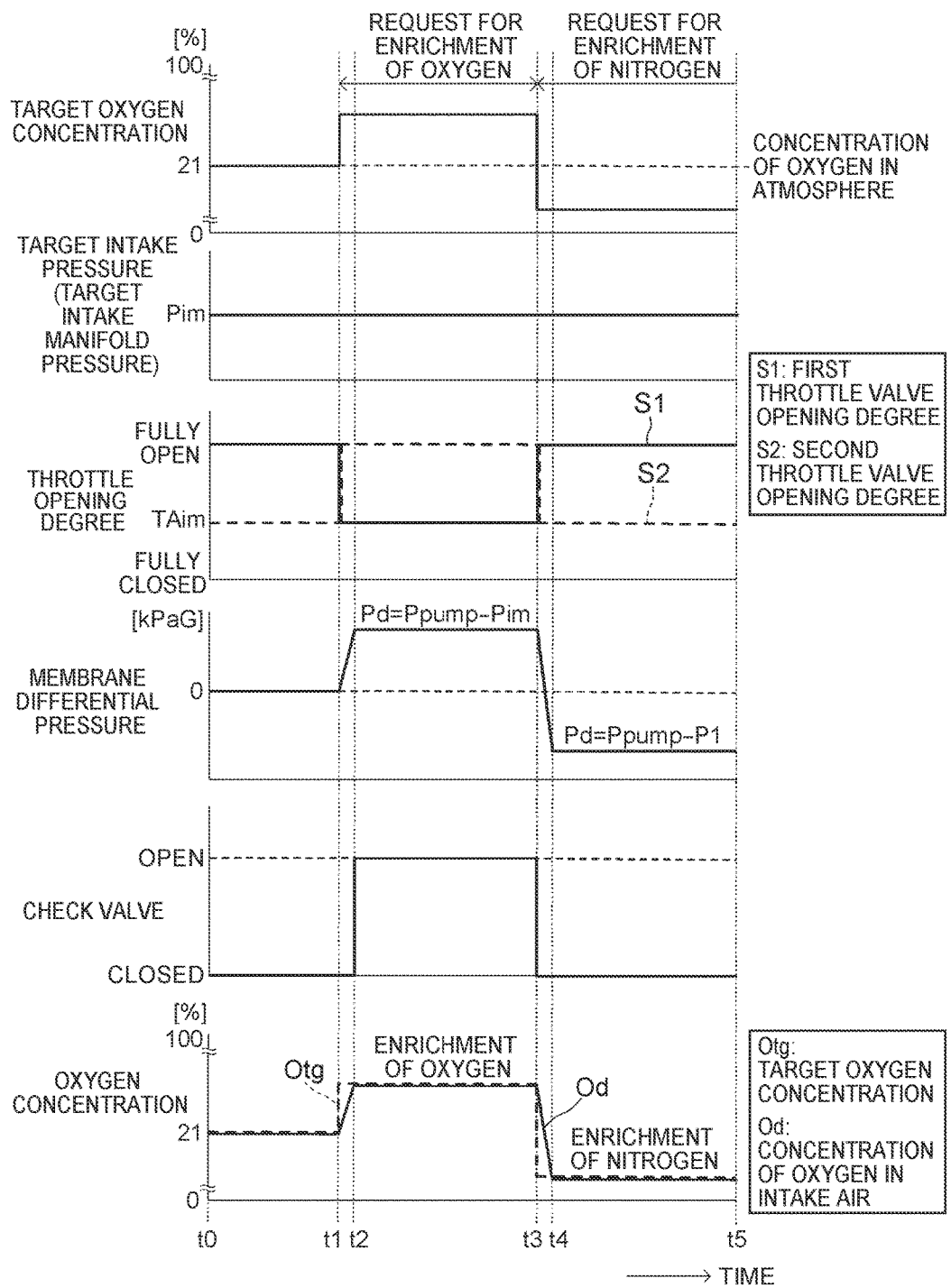

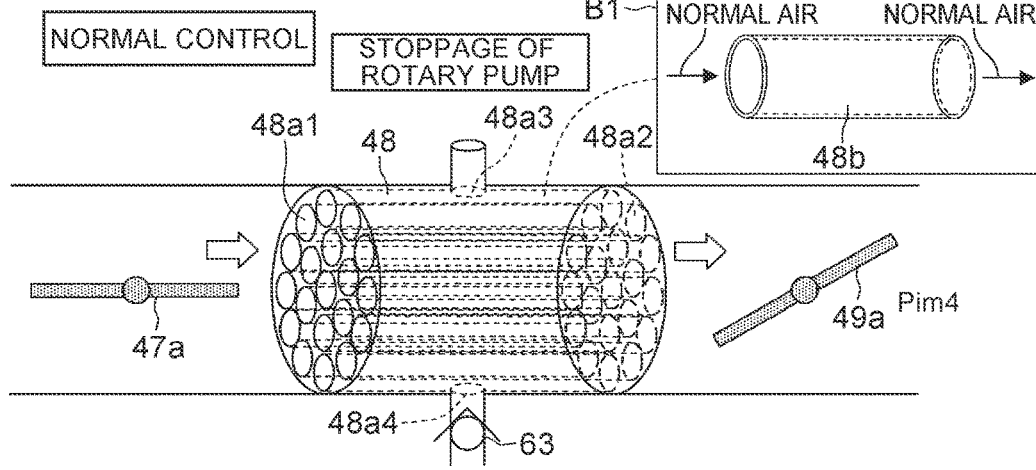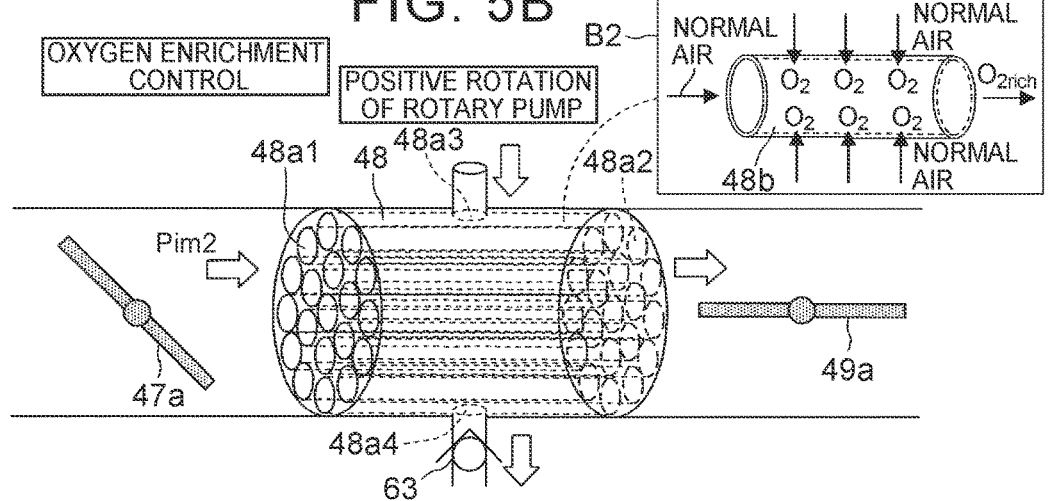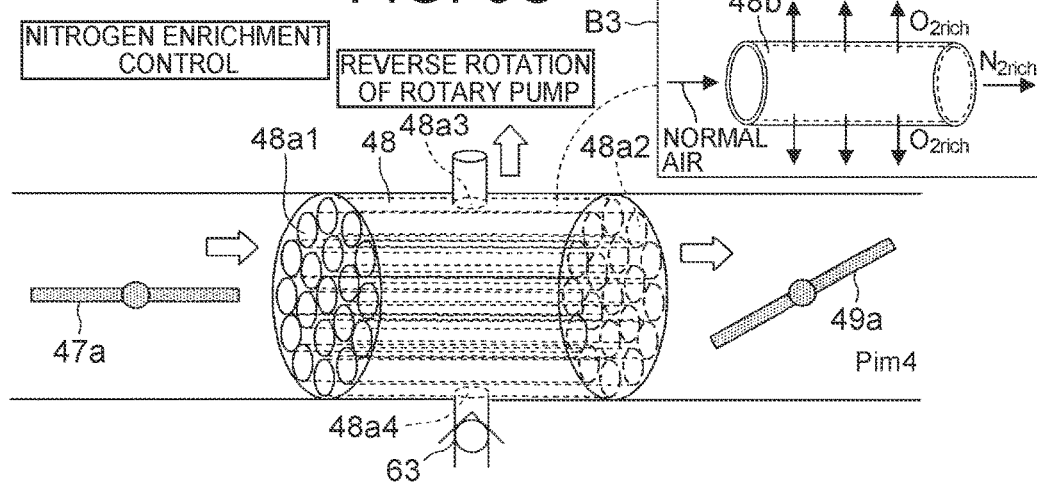

<SECOND EMBODIMENT>

<THIRD EMBODIMENT>

GAS SUPPLY DEVICE FOR INTERNAL COMBUSTION ENGINE AND CONTROL METHOD FOR THE SAME

CROSS-REFERENCE TO RELATED APPLICATIONS

The disclosure of Japanese Patent Application No. 2017-100114 filed on May 19, 2017 including the specification, drawings and abstract is incorporated herein by reference in its entirety.

BACKGROUND

1. Technical Field

The disclosure relates to a gas supply device for an internal combustion engine that reforms an atmosphere (air) into "oxygen-enriched air containing a higher concentration of oxygen than the atmosphere" or "nitrogen-enriched air containing a lower concentration of oxygen than the atmosphere", and that supplies the reformed air to a combustion chamber.

2. Description of Related Art

As described in, for example, Japanese Patent Application Publication No. 2016-166602 (JP 2016-166602 A), one conventionally known gas supply device of this kind (hereinafter referred to as "a conventional device") for an internal combustion engine is equipped with a supercharger (a turbocharger), a gas separation device, a first gas storage device, a second gas storage device, a first valve, a second valve, and a third valve. The gas separation device includes a membrane structure (an oxygen enrichment membrane) that separates the atmosphere (compressed air) pressurized by a compressor of a supercharger into oxygen-enriched air and nitrogen-enriched air.

The first gas storage device stores the oxygen-enriched air obtained through separation by the gas separation device. The first valve controls the amount of oxygen-enriched air supplied to a combustion chamber from the first gas storage device. The second gas storage device stores the nitrogen-enriched air obtained through separation by the gas separation device. The second valve controls the amount of nitrogen-enriched air supplied to the combustion chamber from the second gas storage device. The third valve controls the amount of compressed air supplied to the combustion chamber from the compressor without passing through the gas separation device.

SUMMARY

In order to separate the atmosphere into oxygen-enriched air and nitrogen-enriched air through the use of an oxygen enrichment membrane, a difference in pressure (hereinafter referred to as "a membrane differential pressure") needs to be created between two spaces that are separated from each other by the oxygen enrichment membrane. The conventional device generates the membrane differential pressure by introducing "the atmosphere pressurized by the supercharger" into one of the two spaces.

However, when the internal combustion engine is operated in "a non-supercharging range where the supercharger cannot substantially carry out supercharging (compression and pressurization of the atmosphere)", the conventional device cannot generate a sufficiently high membrane differential pressure. That is, when the internal combustion engine is operated in the non-supercharging range, the conventional device cannot supply oxygen-enriched air or nitrogen-enriched air to the combustion chamber.

The disclosure has been made in view of the above-mentioned problem. That is, the disclosure provides a gas supply device for an internal combustion engine (hereinafter referred to also as "a device of the disclosure") and a control method therefor that can reform the atmosphere into "oxygen-enriched air or nitrogen-enriched air" independently of the operating state of the internal combustion engine and supply the reformed air into a combustion chamber.

Thus, according to one aspect of the disclosure, there is provided a gas supply device for an internal combustion engine. The gas supply device is equipped with an oxygen enrichment membrane module, a first pipe portion, a second pipe portion, a pump portion, and an electronic control unit. The oxygen enrichment membrane module includes a housing and an oxygen enrichment membrane. A space in the housing is separated into a first space and a second space by the oxygen enrichment membrane. The first pipe portion constitutes a first air passage including one end from which an atmosphere can flow into the one end and the other end which communicates with the first space. The second pipe portion constitutes a second air passage including one end which communicates with the first space and the other end which communicates with a combustion chamber of the internal combustion engine. The pump portion is configured to raise a pressure in the second space by supplying the high-pressure atmosphere to the second space, and is configured to lower the pressure in the second space by discharging air in the second space to an outside of the housing from the second space. The electronic control unit is configured to: (i) control a drive state of the pump portion, (ii) supply air to the first space from the second space through the oxygen enrichment membrane, by supplying the high-pressure atmosphere to the second space by driving the pump portion such that the pressure in the second space rises, a concentration of oxygen of the air being higher than a concentration of oxygen of the atmosphere, (iii) perform oxygen enrichment control that merges the air supplied to the first space with the atmosphere that has flowed into the first space through the first air passage, and supplies the merged air and atmosphere to the combustion chamber through the second air passage, the concentration of oxygen of the air being higher than the concentration of oxygen of the atmosphere, and (iv) perform nitrogen enrichment control that discharges air to the second space from the first space through the oxygen enrichment membrane, a concentration of oxygen of the air being higher than a concentration of oxygen of the atmosphere, produces air in the first space, a concentration of nitrogen of the air being higher than a concentration of nitrogen of the atmosphere, and supplies the air containing the higher concentration of nitrogen to the combustion chamber through the second air passage, by discharging the air in the second space to the outside of the housing from the second space by driving the pump portion such that the pressure in the second space falls.

According to another aspect of the disclosure, there is provided a control method for a gas supply device for an internal combustion engine. The gas supply device includes an oxygen enrichment membrane module, a first pipe portion, a second pipe portion, and a pump portion. The oxygen enrichment membrane module includes a housing and an oxygen enrichment membrane. A space in the housing is separated into a first space and a second space by the oxygen enrichment membrane. The first pipe portion constitutes a first air passage including one end from which an atmosphere can flow into the one end and the other end which communicates with the first space. The second pipe portion constitutes a second air passage including one end which communicates with the first space and the other end which communicates with a combustion chamber of the internal combustion engine. The pump portion is configured to raise a pressure in the second space by supplying the high-pressure atmosphere to the second space, and is configured to lower the pressure in the second space by discharging air in the second space to an outside of the housing from the second space. The control method includes: (i) controlling a drive state of the pump portion, (ii) supplying air to the first space from the second space through the oxygen enrichment membrane, by supplying the high-pressure atmosphere to the second space by driving the pump portion such that the pressure in the second space rises, a concentration of oxygen of the air being higher than a concentration of oxygen of the atmosphere, (iii) performing oxygen enrichment control that merges the air supplied to the first space with the atmosphere that has flowed into the first space through the first air passage, and supplies the merged air and atmosphere to the combustion chamber through the second air passage, the concentration of oxygen of the air being higher than the concentration of oxygen of the atmosphere, and (iv) performing nitrogen enrichment control that discharges air to the second space from the first space through the oxygen enrichment membrane, a concentration of oxygen of the air being higher than a concentration of oxygen of the atmosphere, produces air in the first space, a concentration of nitrogen of the air being higher than a concentration of nitrogen of the atmosphere, and supplies the air containing the higher concentration of nitrogen to the combustion chamber through the second air passage, by discharging the air in the second space to the outside of the housing from the second space by driving the pump portion such that the pressure in the second space falls.

According to the gas supply device and the control method therefor as described above, when oxygen enrichment control is performed, the high-pressure atmosphere is supplied to the second space by driving the pump portion such that the pressure in the second space rises. Thus, the difference in pressure (the membrane differential pressure) that is needed to cause the air containing the higher concentration of oxygen than the atmosphere to flow into the first space through the oxygen enrichment membrane is created between the first space and the second space.

When nitrogen enrichment control is performed, the air in the second space is discharged to the outside of the housing from the second space by driving the pump portion such that the pressure in the second space falls. Thus, the difference in pressure (the membrane differential pressure) that is needed to discharge the air containing the higher concentration of oxygen than the atmosphere to the second space through the oxygen enrichment membrane is created between the first space and the second space.

Accordingly, even when the internal combustion engine is in the non-supercharging range, oxygen-enriched air and nitrogen-enriched air can be supplied to the combustion chamber by driving the pump portion.

Besides, in the gas supply device according to the disclosure, the housing may include a first communication hole and a second communication hole. The first communication hole may establish communication between the first space and the other end of the first air passage. The second communication hole may establish communication between the first space and the one end of the second air passage. Also, the first communication hole and the second communication hole may be provided at positions that are opposed to each other. The first pipe portion may be connected to the housing such that the other end of the first air passage communicates with the first communication hole. The second pipe portion may be connected to the housing such that the one end of the second air passage communicates with the second communication hole.

According to the gas supply device as described above, the aforementioned first communication hole and the aforementioned second communication hole are formed at positions that are opposed to each other. Therefore, the atmosphere passing through the oxygen enrichment membrane module toward the combustion chamber is in contact with the oxygen enrichment membrane over a large area or for a long time. Accordingly, the atmosphere passing through the oxygen enrichment membrane module toward the combustion chamber can be efficiently reformed into oxygen-enriched air or nitrogen-enriched air.

Besides, the gas supply device as the device of the disclosure may be equipped with a check valve that is configured to discharge the air in the second space to the outside of the housing by opening when the pressure in the second space becomes equal to or higher than a predetermined valve-opening pressure.

According to the gas supply device as described above, when the pressure in the second space becomes equal to or higher than the predetermined valve-opening pressure, the check valve is opened, and the air in the second space is discharged to the outside. Accordingly, the possibility of the partial pressure of oxygen in the air in the second space becoming excessively low can be reduced, so the air can be sufficiently reformed into oxygen-enriched air.

Besides, the gas supply device as the device of the disclosure may be equipped with a third pipe portion that constitutes a third air passage, one end of the third air passage being connected to the pump portion, and a fourth pipe portion that constitutes a fourth air passage that is opened and closed by the check valve. Also, the housing may be equipped with a third communication hole that establishes communication between the second space and the third air passage, and a fourth communication hole that establishes communication between the second space and the fourth air passage. Also, the third communication hole and the fourth communication hole may be provided at positions that are opposed to each other. Also, the third pipe portion may be connected to the housing such that the other end of the third air passage communicates with the third communication hole, and the fourth pipe portion may be connected to the housing such that the fourth air passage communicates with the fourth communication hole.

According to the gas supply device as described above, the third communication hole and the fourth communication hole are formed at positions that are opposed to each other. Therefore, the atmosphere force-fed from the pump portion is in contact with the oxygen enrichment membrane over a large area or for a long time. Accordingly, a large amount of air containing a higher concentration of oxygen can be supplied to the first space, so the atmosphere passing through the oxygen enrichment membrane module toward the combustion chamber can be efficiently reformed into oxygen-enriched air.

In the gas supply device as the device of the disclosure, the oxygen enrichment membrane may assume a shape of a hollow tube with both end surfaces of the hollow tube open, and may be disposed in such a manner as to connect the first communication hole and the second communication hole to each other. Thus, a space inside the oxygen enrichment membrane may constitute the first space, and a space other than the first space in the housing may constitute the second space. The housing may be provided with the first communication hole, the second communication hole, the third communication hole, and the fourth communication hole such that a direction in which the third communication hole and the fourth communication hole are linked with each other becomes parallel to a surface perpendicular to a direction in which the first communication hole and the second communication hole are linked with each other.

According to the gas supply device as described above, the direction in which the third communication hole and the fourth communication hole are linked with each other is parallel to the surface perpendicular to the direction in which the first communication hole and the second communication hole are linked with each other. Accordingly, the atmosphere passing through the oxygen enrichment module can be efficiently reformed into oxygen-enriched air.

The gas supply device as the device of the disclosure may be further equipped with a compressor, a first throttle valve, and a second throttle valve. The compressor may be a compressor of a supercharger of the internal combustion engine that is disposed in the first pipe portion. The first throttle valve may be disposed in the first pipe portion between the compressor and the oxygen enrichment membrane module, and may be configured to change a passage cross-sectional area of the first air passage through a change in opening degree of the first throttle valve. The second throttle valve may be disposed in the second pipe portion between the oxygen enrichment membrane module and the combustion chamber of the internal combustion engine, and may be configured to change a passage cross-sectional area of the second air passage through a change in opening degree of the second throttle valve. The electronic control unit may be configured to: in performing the oxygen enrichment control, (i) change the opening degree of the first throttle valve in accordance with an in-cylinder requested intake air flow rate as a flow rate of air requested of the combustion chamber of the internal combustion engine, and (ii) set the opening degree of the second throttle valve to an opening degree at a time when the second throttle valve is fully open. Also, the electronic control unit may be configured to: in performing the nitrogen enrichment control, (i) set the opening degree of the first throttle valve to an opening degree at a time when the first throttle valve is fully open, and (ii) change the opening degree of the second throttle valve in accordance with the in-cylinder requested intake air flow rate.

According to the gas supply device as described above, when oxygen enrichment control is performed, the opening degree of the first throttle valve and the opening degree of the second throttle valve are set as described above. Therefore, the pressure in the first space of the oxygen enrichment membrane module is negative. Accordingly, the membrane differential pressure can be generated even without substantial pressurization by the pump portion, so oxygen-enriched air can be supplied with good energy efficiency.

Furthermore, according to the gas supply device as described above, when nitrogen enrichment control is performed, the opening degree of the first throttle valve and the opening degree of the second throttle valve are set as described above. Therefore, the pressure in the first space of the oxygen enrichment membrane module is positive. Accordingly, the membrane differential pressure can be generated without substantial depressurization by the pump portion, so nitrogen-enriched air can be supplied with good energy efficiency.

In the gas supply device as the device of the disclosure, the electronic control unit may be configured to: (i) stop driving the pump portion, (ii) set the opening degree of the first throttle valve to the opening degree at the time when the first throttle valve is fully open, (iii) change the opening degree of the second throttle valve in accordance with the in-cylinder requested intake air flow rate, and (iv) perform normal control for supplying the air flowing into the first space from the first air passage to the combustion chamber through the second air passage, without reforming the air.

According to the gas supply device as described above, the aforementioned normal control is performed with the pump portion stopped from being driven. Accordingly, the pump portion is prevented from consuming energy wastefully.

Moreover, the gas supply device as the device of the disclosure may be further equipped with a fifth pipe portion and a third throttle valve. The fifth pipe portion may constitute a fifth air passage including one end that communicates with a location between the compressor in the first air passage and the first throttle valve and the other end that communicates with a location between the second throttle valve in the second air passage and the communication chamber. Also, the third throttle valve may be disposed in the fifth pipe portion and change a passage cross-sectional area of the fifth air passage through a change in opening degree of the third throttle valve. The electronic control unit may be configured to set the opening degree of the third throttle valve to an opening degree at a time when the third throttle valve is fully closed, in performing the oxygen enrichment control or the nitrogen enrichment control. The electronic control unit may be configured to change the opening degree of the third throttle valve in accordance with the in-cylinder requested intake air flow rate, in performing the normal control.

According to the gas supply device as described above, when normal control is performed, no air flows through the oxygen enrichment membrane module, so there is no pressure loss which would be caused during the flow of air through the oxygen enrichment membrane module. Accordingly, no energy is wastefully consumed, so fuel economy can be improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a time chart for illustrating the outline of the operation of the gas supply device for the internal combustion engine according to the first embodiment of the disclosure;

FIG. 5A is an outline view for illustrating the outline of the operation of the gas supply device for the internal combustion engine according to the first embodiment of the disclosure;

FIG. 5B is another outline view for illustrating the outline of the operation of the gas supply device for the internal combustion engine according to the first embodiment of the disclosure;

FIG. 5C is still another outline view for illustrating the outline of the operation of the gas supply device for the internal combustion engine according to the first embodiment of the disclosure;

DETAILED DESCRIPTION OF EMBODIMENTS

Figure 1:
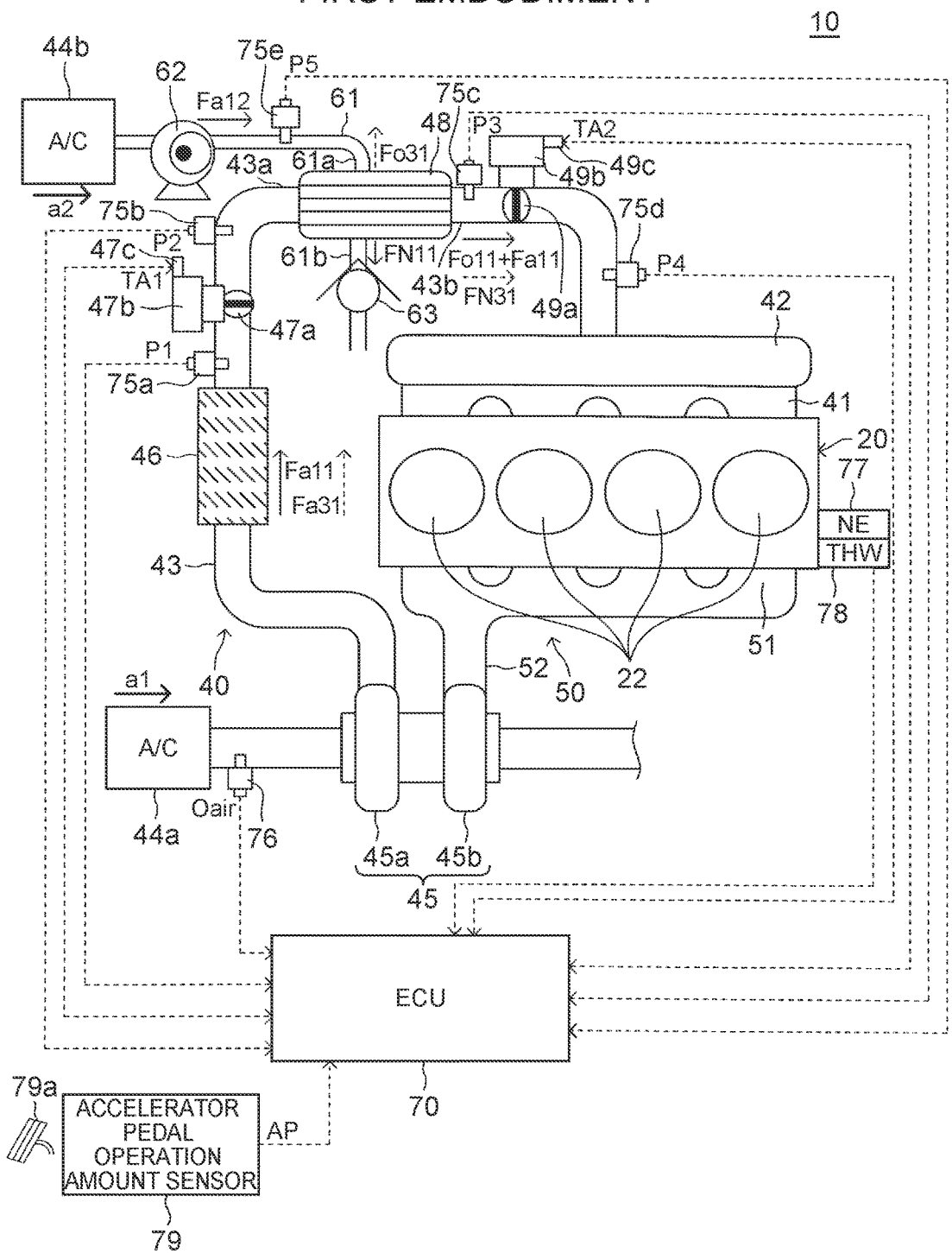
FIG. 1 is an outline view of an internal combustion engine to which a gas supply device for an internal combustion engine according to the first embodiment of the disclosure is applied.

The gas supply device for the internal combustion engine according to each of the embodiments of the disclosure will be described hereinafter with reference to the drawings. Incidentally, like or equivalent components are denoted by like reference symbols in all the drawings of the embodiments of the disclosure.

The configuration of the first embodiment of the disclosure will be described. The gas supply device for the internal combustion engine according to the first embodiment of the disclosure (hereinafter referred to as "a first gas supply device" in some cases) is applied to "an internal combustion engine 10 shown in FIG. 1", which is mounted in a vehicle (not shown). The internal combustion engine 10 is a multi-cylinder (in-line four-cylinder in the present embodiment of the disclosure), four-cycle, and reciprocating piston-type diesel engine. Incidentally, the internal combustion engine 10 may be a gasoline engine. The internal combustion engine 10 includes an engine body portion 20, an intake system 40, and an exhaust system 50.

The engine body portion 20 includes a body including a cylinder block (not shown), a cylinder head (not shown), a crankcase (not shown), and the like. Four cylinders 22 are formed in the body. Fuel injection valves (injectors) (not shown) are disposed in upper portions of the cylinders 22 respectively. The fuel injection valves open in response to a command of an electronic control unit (an engine ECU) 70 that will be described later, and directly inject fuel into the cylinders 22 respectively.

The intake system 40 includes an intake manifold 41, a surge tank 42, an intake pipe 43 including a first pipe portion 43a and a second pipe portion 43b, an air cleaner 44a, a compressor 45a of a turbocharger 45, an intercooler 46, a first throttle valve 47a, a first throttle valve actuator 47b, an oxygen enrichment membrane module 48, a second throttle valve 49a, and a second throttle valve actuator 49b.

The intake manifold 41 is constituted of a plurality of branch-like conduits that are connected to the cylinders 22 respectively in a manner enabling communication. Each of these branch-like conduits is connected at one end thereof to the surge tank 42 as an assembly portion of these conduits, and is connected at the other end thereof to each of the cylinders 22. Furthermore, the surge tank 42 communicates with the second pipe portion 43b of the intake pipe 43. The intake manifold 41, the surge tank 42, and the intake pipe 43 constitute an intake passage. Incidentally, the intake passage that is constituted by the first pipe portion 43a upstream of the oxygen enrichment membrane module 48 will be referred to also as "a first air passage" for the sake of convenience. The intake passage that is constituted by the second pipe portion 43b downstream of the oxygen enrichment membrane module 48 will be referred to also as "a second air passage" for the sake of convenience.

In the intake pipe 43, an air cleaner 44a, a compressor 45a, an intercooler 46, a first throttle valve 47a, an oxygen enrichment membrane module 48, and a second throttle valve 49a are sequentially disposed (interposed), downstream along the flow of intake air indicated by an arrow a1. Furthermore, the oxygen enrichment membrane module 48 is also disposed in an auxiliary conduit 61 including a third pipe portion 61a and a fourth pipe portion 61b. In concrete terms, the oxygen enrichment membrane module 48 is disposed at a merging portion of the intake pipe 43 and the auxiliary conduit 61. In the auxiliary conduit 61, an air cleaner 44b, a well-known rotary pump 62, an oxygen enrichment membrane module 48, and a check valve 63 are sequentially disposed (interposed), downstream along the flow of auxiliary air indicated by an arrow a2.

The auxiliary conduit 61 constitutes an air passage through which air passes (hereinafter referred to as "an external route" in some cases). Incidentally, an air passage that is constituted by the third pipe portion 61a upstream of the oxygen enrichment membrane module 48 will be referred to also as "a third air passage" for the sake of convenience. Incidentally, an air passage that is constituted by the fourth pipe portion 61b downstream of the oxygen enrichment membrane module 48 will be referred to also as "a fourth air passage" for the sake of convenience.

When being positively rotated, the rotary pump 62 ejects pressurized auxiliary air downstream of the rotary pump 62, and thereby force-feeds the auxiliary air to the oxygen enrichment membrane module 48 through the third air passage. Furthermore, when being reversely rotated, the rotary pump 62 sucks and discharges auxiliary air from the oxygen enrichment membrane module 48 through the third air passage. The rotary pump 62 will be referred to also as "a pump portion" for the sake of convenience.

The check valve 63 is disposed in the external route "at a position downstream of the oxygen enrichment membrane module 48". When the pressure of gas (air) flowing out from the oxygen enrichment membrane module 48 is equal to or higher than a predetermined valve-opening pressure, the check valve 63 is open to allow the gas (air) to flow from the oxygen enrichment membrane module 48 to the check valve 63. In other words, when the pressure of gas (air) flowing out from the oxygen enrichment membrane module 48 is lower than the predetermined valve-opening pressure, the check valve 63 is closed to stop and prevent the gas (air) from flowing from the oxygen enrichment membrane module 48 to the check valve 63. Accordingly, the check valve 63 also stops and prevents the gas (air) from flowing from the check valve 63 to the oxygen enrichment membrane module 48.

Each of the air cleaner 44a and the air cleaner 44b is a filtering device that removes foreign matters from auxiliary air. The compressor 45a and the turbine 45b constitute the turbocharger 45. A rotary shaft of the turbine 45b is coupled to a rotary shaft of the compressor 45a. By receiving exhaust gas flowing through an exhaust passage, the turbine 45b rotates to thereby rotate the compressor 45a. The air passing through the intake passage is compressed (supercharged) through rotation of the compressor 45a.

The intercooler 46 is a cooling device for intake air that is provided between an outlet of the turbocharger 45 (the compressor 45a) and the intake manifold 41. The intercooler 46 lowers the temperature of intake air.

The first throttle valve 47a adjusts the amount of air passing through the intake passage by making variable the opening cross-sectional area of the intake passage in a region where the first throttle valve 47a is disposed. The first throttle valve actuator 47b changes the opening degree of the first throttle valve 47a (hereinafter referred to as "a first throttle valve opening degree") in accordance with a command of the ECU 70. Incidentally, the first throttle valve 47a will be referred to also as "a first valve" for the same of convenience, and the first throttle valve opening degree will be referred to also as "a first valve opening degree" for the sake of convenience. Furthermore, the first throttle valve actuator 47b includes a first throttle opening degree sensor 47c for detecting the first throttle valve opening degree.

Figure 2A:
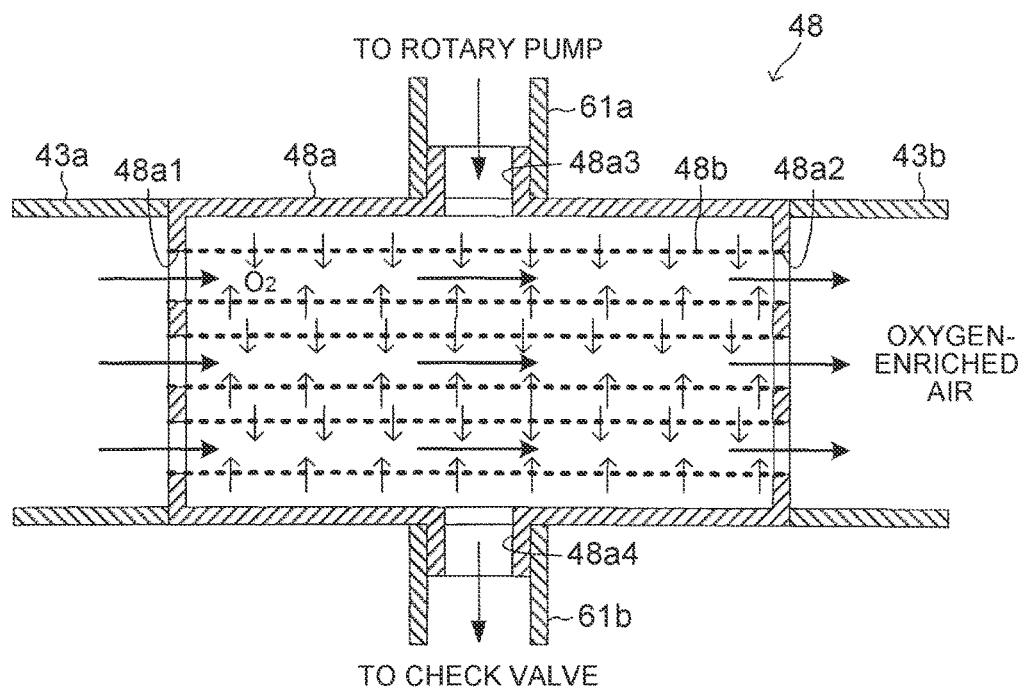
FIG. 2A is an outline view of a longitudinal section of an oxygen enrichment membrane module shown in FIG. 1.
Figure 2B:
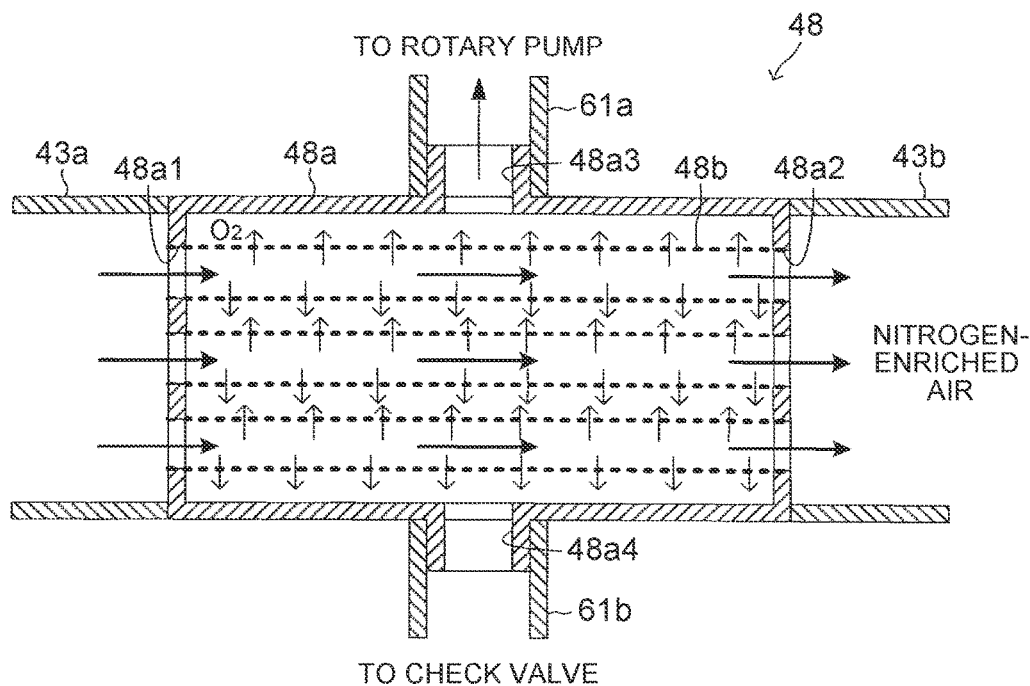
FIG. 2B is another outline view of the longitudinal section of the oxygen enrichment membrane module shown in FIG. 1.
Figure 3A:
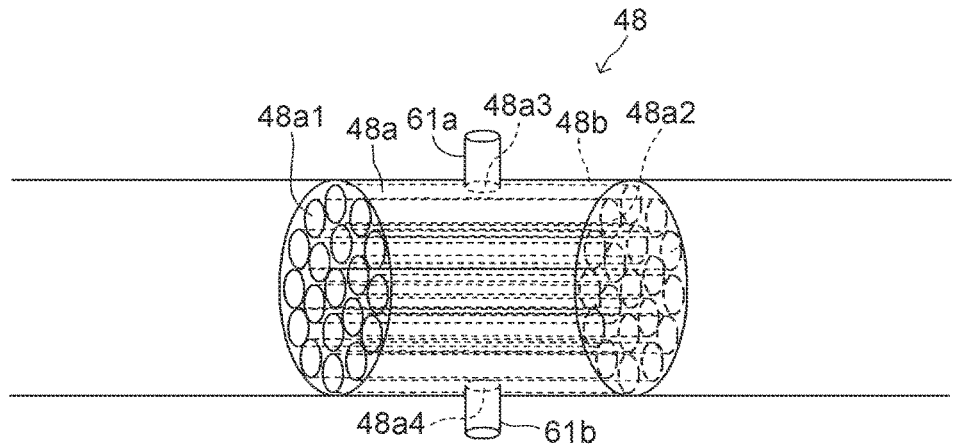
FIG. 3A is an outline view showing the configuration of the oxygen enrichment membrane module.

The oxygen enrichment membrane module 48 reforms the atmosphere into "oxygen-enriched air or nitrogen-enriched air" as needed. Oxygen-enriched air contains a higher concentration of oxygen than the atmosphere, and contains a lower concentration of nitrogen than the atmosphere. Nitrogen-enriched air contains a higher concentration of nitrogen than the atmosphere, and contains a lower concentration of oxygen than the atmosphere. As shown in FIG. 2A, FIG. 2B, and FIG. 3A, the oxygen enrichment membrane module 48 is equipped with a casing portion 48a and an oxygen enrichment membrane (a polymer membrane) 48b.

The casing portion 48a is made of metal, and substantially assumes the shape of a cylinder. The interior of the casing portion 48a is a space (a void). The casing portion 48a is disposed (interposed) in the intake pipe 43 such that an axial direction of the casing portion 48a coincides with an axial direction of the intake pipe 43.

A plurality of first communication holes 48a1 are formed through one end surface of the casing portion 48a. A plurality of second communication holes 48a2 are formed through the other end surface of the casing portion 48a. Each of the first communication holes 48a1 and each of the second communication holes 48a2 are formed at positions that are opposed to each other. That is, "one of the first communication holes 48a1 and one of the second communication holes 48a2" that are opposed to each other are formed such that their central axis coincides with a straight line parallel to the axial direction of the casing portion 48a.

A third communication hole 48a3 is formed through a part of a lateral surface of the casing portion 48a. A fourth communication hole 48a4 is formed through the other part of the lateral surface of the casing portion 48a. The third communication hole 48a3 and the fourth communication hole 48a4 are formed such that their central axis coincides with a straight line perpendicular to the axial direction of the casing portion 48a, in such a manner as to be opposed to each other in the vicinity of a center in the axial direction.

The oxygen enrichment membrane 48b is a well-known membrane made of a polymer such as polyimide resin, silicon or the like (e.g., see Japanese Patent Application Publication No. 2007-113459 (JP 2007-113459 A) and Japanese Patent Application Publication No. 2013-32708 (JP 2013-32708 A)). The oxygen enrichment membrane 48b changes the concentration of oxygen in air and the concentration of nitrogen in air, utilizing the fact that the permeation speed of oxygen molecules through the oxygen enrichment membrane 48b is higher than the permeation speed of nitrogen molecules through the oxygen enrichment membrane in the process of dissolution, diffusion and desorption of the oxygen molecules and nitrogen molecules in air (the atmosphere) to the oxygen enrichment membrane 48b.

The oxygen enrichment membrane 48b assumes the shape of a hollow cylinder, and is formed such that both end surfaces thereof are open. One end surface of the oxygen enrichment membrane 48b is disposed in each of the first communication holes 48a1, and the other end surface of the oxygen enrichment membrane 48b is disposed in each of the second communication holes 48a2. That is, "each of the first communication holes 48a1 and each of the second communication holes 48a2" that are opposed to each other are connected to each other by the tubular oxygen enrichment membrane 48b.

Accordingly, each of the first communication holes 48a1 and each of the second communication holes 48a2 communicate with the hollow inside the oxygen enrichment membrane 48b. On the other hand, the space inside the casing portion 48a and outside the oxygen enrichment membrane 48b communicates with each of the third communication hole 48a3 and the fourth communication hole 48a4. The space inside the casing portion 48a and outside the oxygen enrichment membrane 48b will be referred to hereinafter as "an extra-membrane space" in some cases. In contrast, the space inside the oxygen enrichment membrane 48b will be referred to as "an intra-membrane space" in some cases. Incidentally, the intra-membrane space will be referred to also as "a first space" for the sake of convenience. The extra-membrane space will be referred to also as "a second space".

The third communication hole 48a3 is connected to the auxiliary conduit 61 (the third pipe portion 61a) on the rotary pump 62 side, and communicates with an air passage (an external route) that is formed by the auxiliary conduit 61. The fourth communication hole 48a4 is connected to the auxiliary conduit 61 (the fourth pipe portion 61b) on the check valve 63 side, and communicates with the air passage (the external route) that is formed by the auxiliary conduit 61.

The pressure in the extra-membrane space can be raised (pressurization), and the pressure in the space can be lowered (depressurization), through the use of the rotary pump 62. In other words, the pressure in the extra-membrane space can be made higher or lower than the pressure in the intra-membrane space, by the rotary pump 62. That is, a difference in pressure can be created between the intra-membrane space and the extra-membrane space, which are separated from each other by the oxygen enrichment membrane 48b.

Figure 3B:
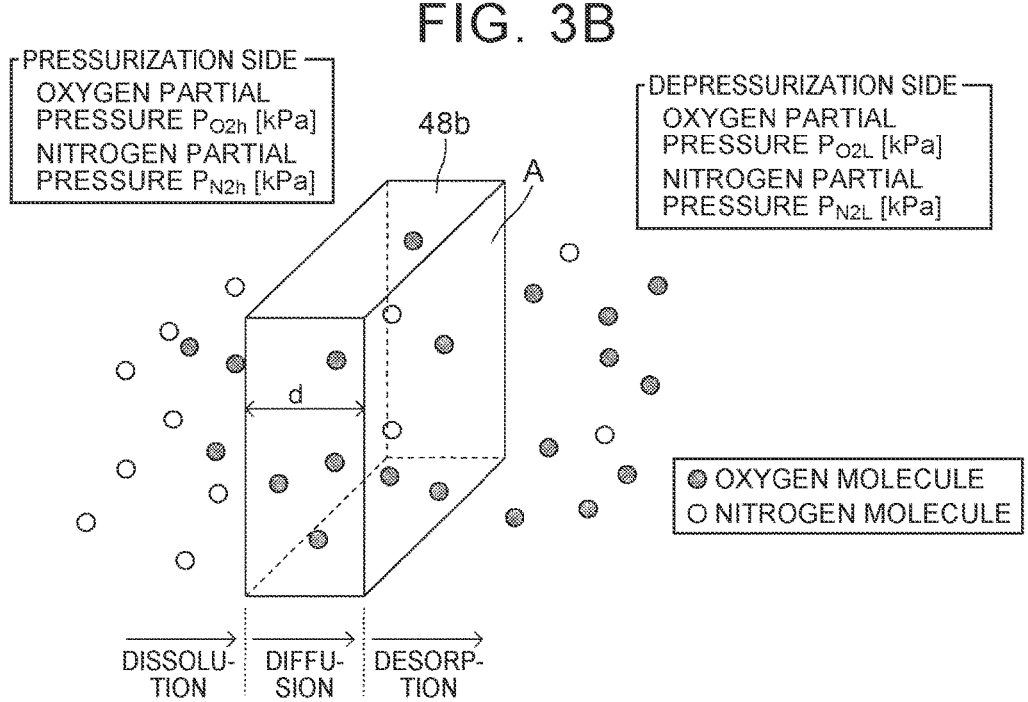
FIG. 3B is a schematic view for illustrating a mechanism of an oxygen enrichment membrane.

As described previously, the oxygen enrichment membrane 48b can change the concentration of oxygen in air and the concentration of nitrogen in air. In more concrete terms, as shown in FIG. 3B, when a difference in pressure is created across the oxygen enrichment membrane 48b, "the oxygen molecules and nitrogen molecules" that are in contact with a high pressure-side (pressurization-side) surface of the oxygen enrichment membrane 48b are dissolved to the oxygen enrichment membrane 48b from the pressurization-side surface, diffused in the oxygen enrichment membrane 48b, and then desorbed from a low pressure-side (depressurization-side) surface of the oxygen enrichment membrane 48b. At this time, a permeation coefficient $Z_{O2}$ of oxygen through the oxygen enrichment membrane 48b is larger than a permeation coefficient $Z_{N2}$ of nitrogen through the oxygen enrichment membrane 48b.

Accordingly, oxygen molecules permeate the oxygen enrichment membrane 48b faster than nitrogen molecules. In other words, the amount of oxygen molecules permeating the oxygen enrichment membrane 48b from the high-pressure side and moving toward the low-pressure side per unit time is larger than the amount of nitrogen molecules permeating the oxygen enrichment membrane 48b from the high-pressure side and moving toward the low-pressure side per unit time. Thus, the air that has permeated the oxygen enrichment membrane 48b becomes oxygen-enriched air, and the air that has not permeated the oxygen enrichment membrane 48b becomes nitrogen-enriched air. Incidentally, a permeation amount $Q_{O2}$ of oxygen through the oxygen enrichment membrane 48b is expressed by Equation (1) shown in FIG. 3B. A permeation amount $Q_{N2}$ of nitrogen through the oxygen enrichment membrane 48b is expressed by Equation (2) shown in FIG. 3B.

The first gas supply device reforms the intake air supplied to the oxygen enrichment membrane module 48 into oxygen-enriched air containing a higher concentration of oxygen than the intake air and nitrogen-enriched air containing a lower concentration of oxygen (containing a higher concentration of nitrogen) than the intake air, through the use of the characteristics of this oxygen enrichment membrane 48b. Then, the first gas supply device supplies one of the oxygen-enriched air and the nitrogen-enriched air (i.e., the reformed intake air) into each of combustion chambers of the cylinders 22.

In concrete terms, the first gas supply device positively rotates the rotary pump 62 in reforming the intake air flowing into the intra-membrane space from the first communication holes 48a1 into oxygen-enriched air and discharging the oxygen-enriched air from the second communication holes 48a2. As a result, the pressure of auxiliary air introduced into the extra-membrane space from the external route and the third communication hole 48a3 becomes higher than the pressure of intake air in the intra-membrane space. Accordingly, the auxiliary air in the extra-membrane space is separated into the air permeating the oxygen enrichment membrane 48b, discharged to the intra-membrane space and containing a high concentration of oxygen, and the air remaining in the extra-membrane space and containing a high concentration of nitrogen. Then, as shown in FIG. 2A, the air discharged to the intra-membrane space and containing a high concentration of oxygen is mixed with the intake air that has flowed into the intra-membrane space from the first communication holes 48a1. Thus, the intake air that has flowed into the intra-membrane space from the first communication holes 48a1 is reformed into oxygen-enriched air, and the oxygen-enriched air is discharged from the second communication holes 48a2. The oxygen-enriched air is supplied to each of the combustion chambers of the cylinders 22 through the intake pipe 43 (the second pipe portion 43b) and the surge tank 42.

In contrast, the first gas supply device reversely rotates the rotary pump 62 in reforming the intake air flowing into the intra-membrane space from the first communication holes 48a1 into nitrogen-enriched air, and discharging the nitrogen-enriched air from the second communication holes 48a2. As a result, the pressure of intake air introduced into the intra-membrane space from the first communication holes 48a1 becomes higher than the pressure of auxiliary air in the extra-membrane space. Accordingly, as shown in FIG. 2B, the intake air in the intra-membrane space is separated into the air permeating the oxygen enrichment membrane 48b, discharged to the extra-membrane space and containing a high concentration of oxygen, and the air remaining in the intra-membrane space and containing a high concentration of nitrogen. Thus, the intake air that has flowed into the intra-membrane space from the first communication holes 48a1 is reformed into nitrogen-enriched air, and the nitrogen-enriched air is discharged from the second communication holes 48a2. The nitrogen-enriched air is supplied to each of the combustion chambers of the cylinders 22 through the intake pipe 43 (the second pipe portion 43b) and the surge tank 42.

Referring again to FIG. 1, the second throttle valve 49a adjusts the amount of air passing through the intake passage by making variable the opening cross-sectional area of the intake passage in a region where the second throttle valve 49a is disposed. The second throttle valve actuator 49b changes the opening degree of the second throttle valve 49a (hereinafter referred to as "a second throttle valve opening degree") in accordance with a command of the ECU 70. Incidentally, the second throttle valve 49a will be referred to also as "a second valve" for the sake of convenience, and the second throttle valve opening degree will be referred to also as "a second valve opening degree" for the sake of convenience. Furthermore, the second throttle valve actuator 49b includes a second throttle opening degree sensor 49c for detecting the second throttle valve opening degree.

The exhaust system 50 includes an exhaust manifold 51, an exhaust pipe 52, and the turbine 45b of the turbocharger 45.

The exhaust manifold 51 includes "branch portions that are connected to the cylinders 22 respectively" and "an assembly portion of these branch portions". The exhaust pipe 52 is connected to the assembly portion of the exhaust manifold 51. The exhaust manifold 51 and the exhaust pipe 52 constitute the exhaust passage. The turbine 45b is disposed in the exhaust pipe 52.

The ECU 70 is an electronic circuit including a well-known microcomputer, and includes a CPU, a ROM, a RAM, a backup RAM, an interface and the like. The ECU 70 is connected to a group of sensors that will be mentioned below, and receives (has input thereto) signals from these sensors. Furthermore, the ECU 70 delivers command (drive) signals to various actuators, and controls the internal combustion engine 10.

The ECU 70 is connected to the first throttle opening degree sensor 47c and the second throttle opening degree sensor 49c. The first throttle opening degree sensor 47c detects the first throttle valve opening degree of the first throttle valve 47a, and outputs a signal representing a first throttle valve opening degree TA1. The second throttle opening degree sensor 49c detects the second throttle valve opening degree of the second throttle valve 49a, and outputs a signal representing a second throttle valve opening degree TA2.

Furthermore, the ECU 70 is connected to intake pipe pressure sensors 75a to 75d, an auxiliary conduit pressure sensor 75e, an oxygen concentration sensor 76, an engine rotational speed sensor 77, a liquid temperature sensor 78, and an accelerator pedal operation amount sensor 79.

The intake pipe pressure sensor 75a outputs a signal representing a pressure P1 of intake air in the intake passage downstream of the intercooler 46 and in the intake pipe 43 upstream of the first throttle valve 47a. The intake pipe pressure sensor 75b outputs a signal representing a pressure P2 in the intake passage downstream of the first throttle valve 47a and in the intake pipe 43 upstream of the oxygen enrichment membrane module 48. The intake pipe pressure sensor 75c outputs a signal representing a pressure P3 of intake air in the intake passage downstream of the oxygen enrichment membrane module 48 and in the intake pipe 43 upstream of the second throttle valve 49a. The intake pipe pressure sensor 75d outputs a signal representing a pressure P4 of intake air in the intake passage downstream of the second throttle valve 49a and in the intake pipe upstream of the surge tank 42. The auxiliary conduit pressure sensor 75e outputs a signal representing a pressure P5 in the external route downstream of the rotary pump 62 and in the auxiliary conduit 61 upstream of the oxygen enrichment membrane module 48.

The oxygen concentration sensor 76 outputs a signal representing a concentration Oair of oxygen in the intake air (i.e., the atmosphere) introduced into the intake passage through the air cleaner 44a.

The engine rotational speed sensor 77 measures a rotational speed (an engine rotational speed) NE of the internal combustion engine 10, and outputs a signal representing this engine rotational speed NE.

The liquid temperature sensor 78 is disposed in a cylinder block portion of the engine body portion 20. The liquid temperature sensor 78 measures a temperature (a cooling liquid temperature THW) of coolant for cooling the engine body portion 20, and outputs a signal representing this cooling liquid temperature THW.

The accelerator pedal operation amount sensor 79 detects an operation amount (an accelerator depression amount) of an accelerator pedal 79a of the vehicle, and outputs a signal representing an accelerator pedal operation amount AP.

Outline of Operation

Next, the outline of the operation performed by the first gas supply device will be described. The first gas supply device changes the concentration of oxygen (and the concentration of nitrogen) in the intake air supplied into each of the combustion chambers, in accordance with the operating state of the internal combustion engine 10.

In concrete terms, the ECU 70 determines a target value of the concentration of oxygen (i.e., a target oxygen concentration Otg) in the intake air supplied into each of the combustion chambers of the cylinders 22, based on the operating state of the internal combustion engine 10. The ECU 70 compares "the concentration Oair of oxygen in intake air (the atmosphere)" acquired by the oxygen concentration sensor 76 with "the target oxygen concentration Otg".

Incidentally, the concentration Oair of oxygen in intake air (the atmosphere) acquired by the oxygen concentration sensor 76 will be referred to hereinafter as "the detected oxygen concentration Oair". The intake air eventually supplied to each of the cylinders 22 will be referred to as "cylinder intake air". The intake air on the verge of flowing into the oxygen enrichment membrane module 48 through the intake pipe 43 will be referred to as "enrichment membrane inflow air". The air including the same composition as the atmosphere will be referred to as "normal air". The throttle valve opening degree at the time when the first throttle valve 47a is fully open will be referred to as "a first full-admission opening degree". The throttle valve opening degree at the time when the second throttle valve 49a is fully open will be referred to as "a second full-admission opening degree".

When the detected oxygen concentration Oair is equal to the target oxygen concentration Otg, the ECU 70 performs "normal control" for supplying enrichment membrane inflow air to each of the cylinders 22 as cylinder intake air, without changing the concentration of oxygen in enrichment membrane inflow air by the oxygen enrichment membrane module 48. When the detected oxygen concentration Oair is lower than the target oxygen concentration Otg, the ECU 70 performs "oxygen enrichment control" for raising the concentration of oxygen in cylinder intake air by raising the concentration of oxygen in enrichment membrane inflow air by the oxygen enrichment membrane module 48. Incidentally, when the detected oxygen concentration Oair is lower than the target oxygen concentration Otg, the ECU 70 generates an oxygen enrichment request. When the detected oxygen concentration Oair is higher than the target oxygen concentration Otg, the ECU 70 performs "nitrogen enrichment control" for lowering the concentration of oxygen (raising the concentration of nitrogen) in cylinder intake air, by lowering the concentration of oxygen in enrichment membrane inflow air by the oxygen enrichment membrane module 48. Incidentally, when the detected oxygen concentration Oair is higher than the target oxygen concentration Otg, the ECU 70 generates a nitrogen enrichment request.

For instance, in the example shown in FIG. 4, the detected oxygen concentration Oair is equal to the target oxygen concentration Otg during a period from a timing t0 to a time point immediately before a timing t1. Accordingly, during this period, neither an oxygen enrichment request nor a nitrogen enrichment request is generated.

When neither an oxygen enrichment request nor a nitrogen enrichment request is generated, the ECU 70 performs the following operation shown in FIG. 5A. (i) The ECU 70 stops the rotary pump 62. (ii) The ECU 70 sets the first throttle valve opening degree TA1 of the first throttle valve 47a to "the first full-admission opening degree". (iii) The ECU 70 determines the target value of the pressure in the region where the intake pipe pressure sensor 75d is disposed, as a target intake pressure Pim4, based on "the engine rotational speed NE and an in-cylinder requested intake air flow rate". It should be noted herein that the in-cylinder requested intake air flow rate is a flow rate of cylinder intake air requested of each of the cylinders 22. (iv) The ECU 70 separately calculates the in-cylinder requested intake air flow rate based on "the engine rotational speed NE and the accelerator pedal operation amount AP". (v) The ECU 70 controls the second throttle valve opening degree TA2 such that the pressure P4 of intake air detected by the intake pipe pressure sensor 75d coincides with the target intake pressure Pim4.

In this case, in the oxygen enrichment membrane module 48, no substantial difference in pressure is created between the intra-membrane space and the extra-membrane space. Therefore, as indicated by a block B1 in FIG. 5A, enrichment membrane inflow air as normal air passes through the intra-membrane space without permeating the oxygen enrichment membrane 48b, and is discharged to the intake passage of the intake pipe 43 from the second communication holes 48a2. Accordingly, enrichment membrane inflow air passes through the oxygen enrichment membrane module 48 and becomes cylinder intake air, with the concentration of oxygen therein remaining unchanged. Incidentally, the air thus passing through the oxygen enrichment membrane module 48 and discharged to the intake pipe 43 from the second communication holes 48a2 will be referred to also as "discharge intake air" for the sake of convenience.

In the example shown in FIG. 4, the target oxygen concentration Otg becomes high at the timing t1. As a result, the detected oxygen concentration Oair becomes lower than the target oxygen concentration Otg at the timing t1, so oxygen-enriched air is requested. That is, an oxygen enrichment request is generated at the timing t1. Thus, the ECU 70 starts oxygen enrichment control at the timing t1.

In this case, the ECU 70 performs the following operation shown in FIG. 5B. The ECU 70 (i) sets the second throttle valve opening degree TA2 of the second throttle valve 49a to "the second full-admission opening degree". The ECU 70 (ii) determines the target value of the pressure in the region where the intake pipe pressure sensor 75b is disposed, as a target intake pressure Pim2, based on the engine rotational speed NE and the in-cylinder requested intake air flow rate. The ECU 70 (iii) controls the first throttle valve opening degree TA1 of the first throttle valve 47a such that the pressure P2 of intake air detected by the intake pipe pressure sensor 75b coincides with the target intake pressure Pim2. The ECU 70 (iv) determines a target membrane differential pressure Pd based on the in-cylinder requested intake air flow rate and the target oxygen concentration Otg. In this case, the target membrane differential pressure Pd is a positive value. The ECU 70 (v) sets a target pump pressure Ppump as a target value of the pressure of auxiliary air (i.e., a target value of the pressure in the extra-membrane space) to a pressure (Pim2+Pd) obtained by summating the target intake pressure Pim2 and the target membrane differential pressure Pd. The ECU 70 (vi) positively rotates the rotary pump 62 such that the pressure P5 of auxiliary air force-fed by the rotary pump 62 (the pressure P5 detected by the auxiliary conduit pressure sensor 75e) coincides with the target pump pressure Ppump.

Thus, the pressure in the extra-membrane space coincides with the target pump pressure Ppump (=Pim2+Pd), and the pressure in the intra-membrane space coincides with the target intake pressure Pim2. Accordingly, the extra-membrane space and the intra-membrane space become the high-pressure side and the low-pressure side respectively, so the membrane differential pressure Pd obtained by subtracting Pim2 from Ppump (=Ppump−Pim2>0) is generated.

As a result, as indicated by a block B2 in FIG. 5B, the auxiliary air supplied to the extra-membrane space through the auxiliary conduit 61 and the third communication hole 48a3 permeates the oxygen enrichment membrane 48b and is discharged to the intra-membrane space. The auxiliary air discharged to this intra-membrane space contains a higher concentration of oxygen than the auxiliary air (normal air) that has not permeated the oxygen enrichment membrane 48b yet. On the other hand, the auxiliary air in the extra-membrane space contains a lower concentration of oxygen than normal air.

As a result, enrichment membrane inflow air is reformed into oxygen-enriched air, and the oxygen-enriched air obtained through reformation is supplied to each of the cylinders 22 as cylinder intake air (discharge intake air). This "control from the timing t1" is oxygen enrichment control.

As shown in FIG. 4, through this oxygen enrichment control, the membrane differential pressure (P5−P2) rises toward the target membrane differential pressure Pd (=Ppump (positive pressure)−Pim (negative pressure)>0), and the concentration Od of oxygen in each of discharge intake air and cylinder intake air rises toward the target oxygen concentration Otg, from the timing t1. Furthermore, the membrane differential pressure (P5−P2) coincides with the target membrane differential pressure Pd, and the concentration Od of oxygen in each of discharge intake air and cylinder intake air coincides with the target oxygen concentration Otg, at and after the timing t2.

Figure 6:
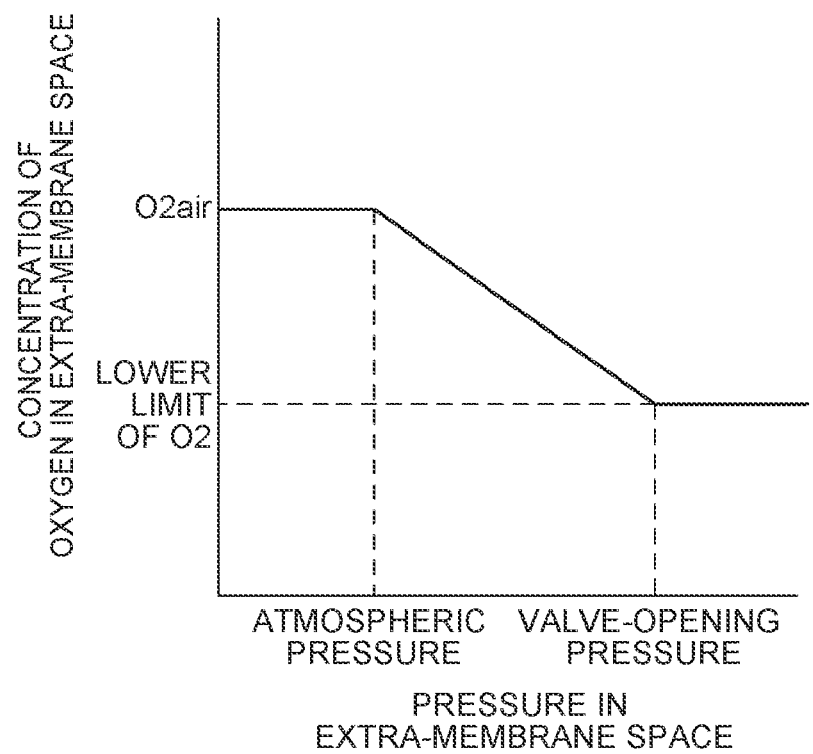
FIG. 6 is a graph showing a relationship between a pressure in an extra-membrane space of the oxygen enrichment membrane module (an extra-membrane pressure) and a concentration of oxygen in the extra-membrane space of the oxygen enrichment membrane module (an extra-membrane oxygen concentration)

Incidentally, when the extra-membrane pressure P5 applied to the check valve 63 becomes equal to or higher than the predetermined valve-opening pressure as a result of the continuation of positive rotation of the rotary pump 62 after the start of the above-mentioned oxygen enrichment control, the check valve 63 is opened. Thus, "the auxiliary air containing a high concentration of nitrogen and a low concentration of oxygen" in the extra-membrane space is discharged to the outside (the atmosphere) through the fourth communication hole 48a4, and normal air flows into the extra-membrane space through the third communication hole 48a3. Accordingly, as indicated by a graph of FIG 6, the concentration of oxygen in the extra-membrane space is held equal to an $O_2$ lower limit. In consequence, the concentration of oxygen in the extra-membrane space does not fall too much. Therefore, a difference (a difference in partial pressure) between the partial pressure of oxygen in the extra-membrane space and the partial pressure of oxygen in the intra-membrane space is held equal to or higher than a partial pressure needed for permeation of the oxygen enrichment membrane 48b by oxygen.

In the example shown in FIG. 4, the target oxygen concentration Otg becomes low at a timing t3. As a result, at the timing t3, the detected oxygen concentration Oair becomes higher than the target oxygen concentration Otg, so nitrogen-enriched air is requested. That is, a nitrogen enrichment request is generated at the timing t3. Thus, the ECU 70 starts nitrogen enrichment control at the timing t3.

In this case, the ECU 70 performs the following operation shown in FIG. 5C. The ECU 70 (i) sets the first throttle valve opening degree TA1 of the first throttle valve 47a to "the first full-admission opening degree". The ECU 70 (ii) determines the target value of the pressure in the region where the intake pipe pressure sensor 75d is disposed, as the target intake pressure Pim4, based on the engine rotational speed NE and the in-cylinder requested intake air flow rate. The ECU 70

(iii) controls the second throttle valve opening degree TA2 of the second throttle valve 49a such that the pressure P4 of intake air detected by the intake pipe pressure sensor 75d coincides with the target intake pressure Pim4. The ECU 70 (iv) determines the target membrane differential pressure Pd based on the in-cylinder requested intake air flow rate and the target oxygen concentration Otg. In this case, the target membrane differential pressure Pd is a negative value. The ECU 70 (v) sets the target pump pressure Ppump as the target value of the pressure of auxiliary air (i.e., the target value of the pressure in the extra-membrane space) to a pressure (P1+Pd) obtained by summating "the pressure P1 immediately after the passage through the intercooler as detected by the intake pipe pressure sensor 75a" and "the target membrane differential pressure Pd". Incidentally, in this case, the first throttle valve opening degree TA1 is equal to "the first full-admission opening degree". Therefore, the pressure of enrichment membrane inflow air (i.e., the pressure in the intra-membrane space) and the pressure P1 are substantially equal to each other. The ECU 70 (vi) reversely rotates the rotary pump 62 such that the pressure P5 of auxiliary air force-fed by the rotary pump 62 (the pressure P5 detected by the auxiliary conduit pressure sensor 75e) coincides with the target pump pressure Ppump. That is, the ECU 70 lowers the pressure in the extra-membrane space.

Thus, the pressure in the extra-membrane space coincides with the target pump pressure Ppump (=P1+Pd). On the other hand, as described previously, the pressure in the intra-membrane space is substantially equal to the pressure P1. Accordingly, the extra-membrane space and the intra-membrane space become the low-pressure side and the high-pressure side respectively, and the membrane differential pressure Pd (=Ppump−P1<0) obtained by subtracting P1 from Ppump is generated.

As a result, as indicated by a block B3 in FIG. 5C, the air supplied to the intra-membrane space through the first communication holes 48a1 permeates the oxygen enrichment membrane 48b and is discharged to the extra-membrane space. The air discharged to this extra-membrane space contains a higher concentration of oxygen than the air (normal air) that has not permeated the oxygen enrichment membrane 48b yet. Accordingly, the air remaining in the intra-membrane space and flowing therethrough becomes nitrogen-enriched air containing a lower concentration of oxygen than normal air.

As a result, enrichment membrane inflow air is reformed into nitrogen-enriched air, and the nitrogen-enriched air obtained through reformation is supplied to each of the cylinders 22 as cylinder intake air (discharge intake air). This "control from the timing t3" is nitrogen enrichment control.

As shown in FIG. 4, through this nitrogen enrichment control, the membrane differential pressure (P5−P2) falls toward the target membrane differential pressure Pd (=Ppump (negative pressure)−P1 (positive pressure)), and the concentration Od of oxygen in each of discharge intake air and cylinder intake air falls toward the target oxygen concentration Otg, from the timing t3. Furthermore, the membrane differential pressure (P5−P2) coincides with the target membrane differential pressure Pd, and the concentration Od of oxygen in each of discharge intake air and cylinder intake air coincides with the target oxygen concentration Otg, at and after a timing t4. The foregoing is the outline of the operation of the first gas supply device.

Next, the effect of the first gas supply device will be described. The first gas supply device has more excellent effects, which will be described below, than, for example, a typical gas supply device for an internal combustion engine 200 according to a reference example (a related art) of the present first embodiment of the disclosure shown in FIG. 7.

In the reference example, the intake air that has passed through the intercooler 46 is separated into oxygen-enriched air and nitrogen-enriched air in passing through the oxygen enrichment membrane module 48. The oxygen-enriched air is stored into an oxygen tank 221, and the nitrogen-enriched air is stored into a nitrogen tank 222. An ECU (not shown) provided in the reference example performs oxygen enrichment control and nitrogen enrichment control, which will be described below, by sending signals to throttle valve actuators 211b to 213b and appropriately controlling the throttle valve opening degrees of an oxygen throttle valve 211a, a nitrogen throttle valve 212a, and an air throttle valve 213a. Incidentally, the throttle valve opening degrees of the throttle valves 211a to 213a are detected by the throttle opening degree sensors 211c to 213c respectively.

Next, a contrast between oxygen enrichment control according to the reference example and oxygen enrichment control of the first gas supply device will be described. In performing oxygen enrichment control, the ECU according to the reference example sets the throttle valve opening degree of the air throttle valve 213a to "a predetermined throttle valve opening degree (e.g., a more or less intermediate throttle valve opening degree)", sets the throttle valve opening degree of the oxygen throttle valve 211a to "a throttle valve opening degree at the time when the oxygen throttle valve 211a is fully open", and sets the throttle valve opening degree of the nitrogen throttle valve 212a to "a throttle valve opening degree at the time when the nitrogen throttle valve 212a is fully closed".

Figure 7:
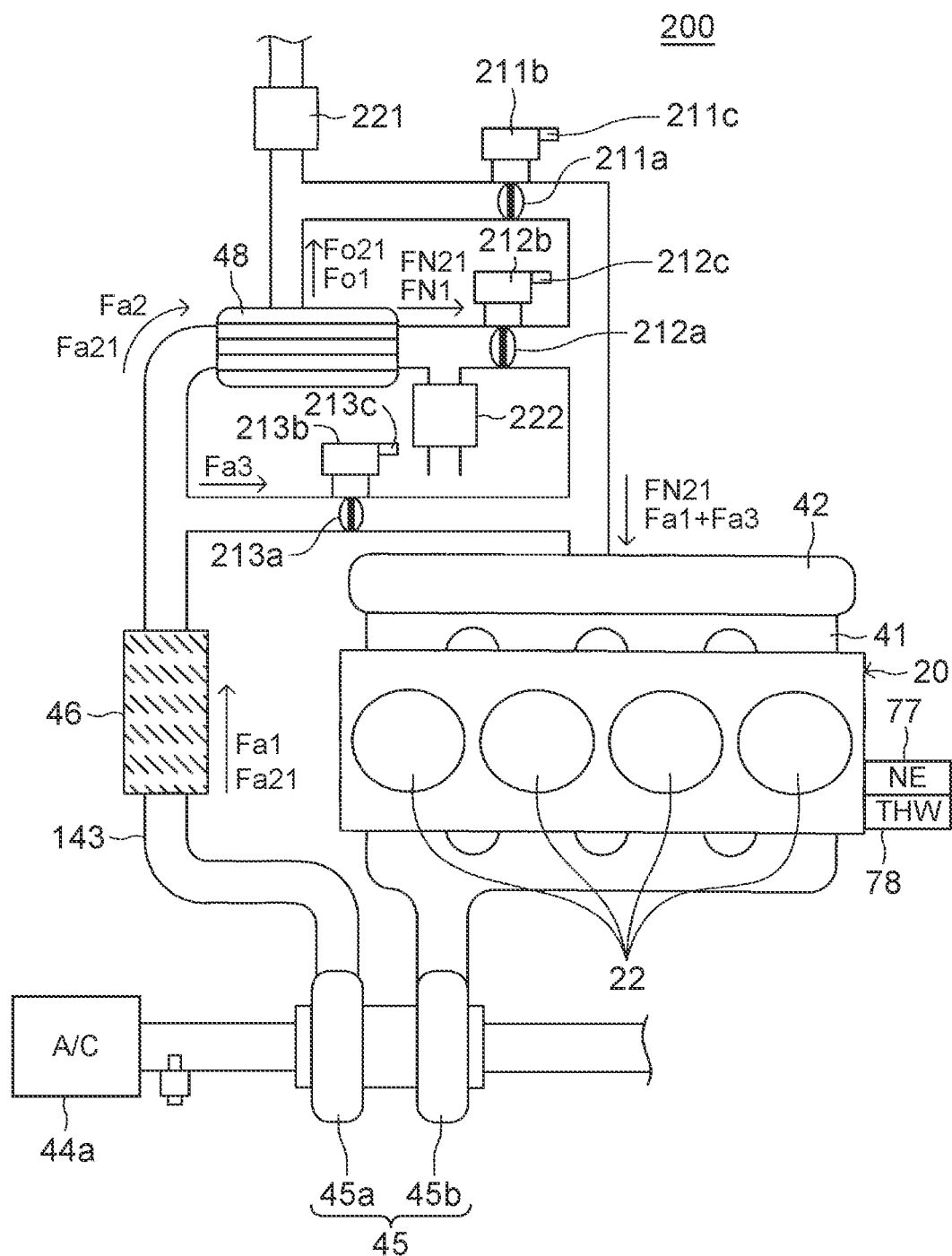
FIG. 7 is an outline view of an internal combustion engine to which a gas supply device according to a reference example (a related art) of the present embodiment of the disclosure is applied.
Figure 8:
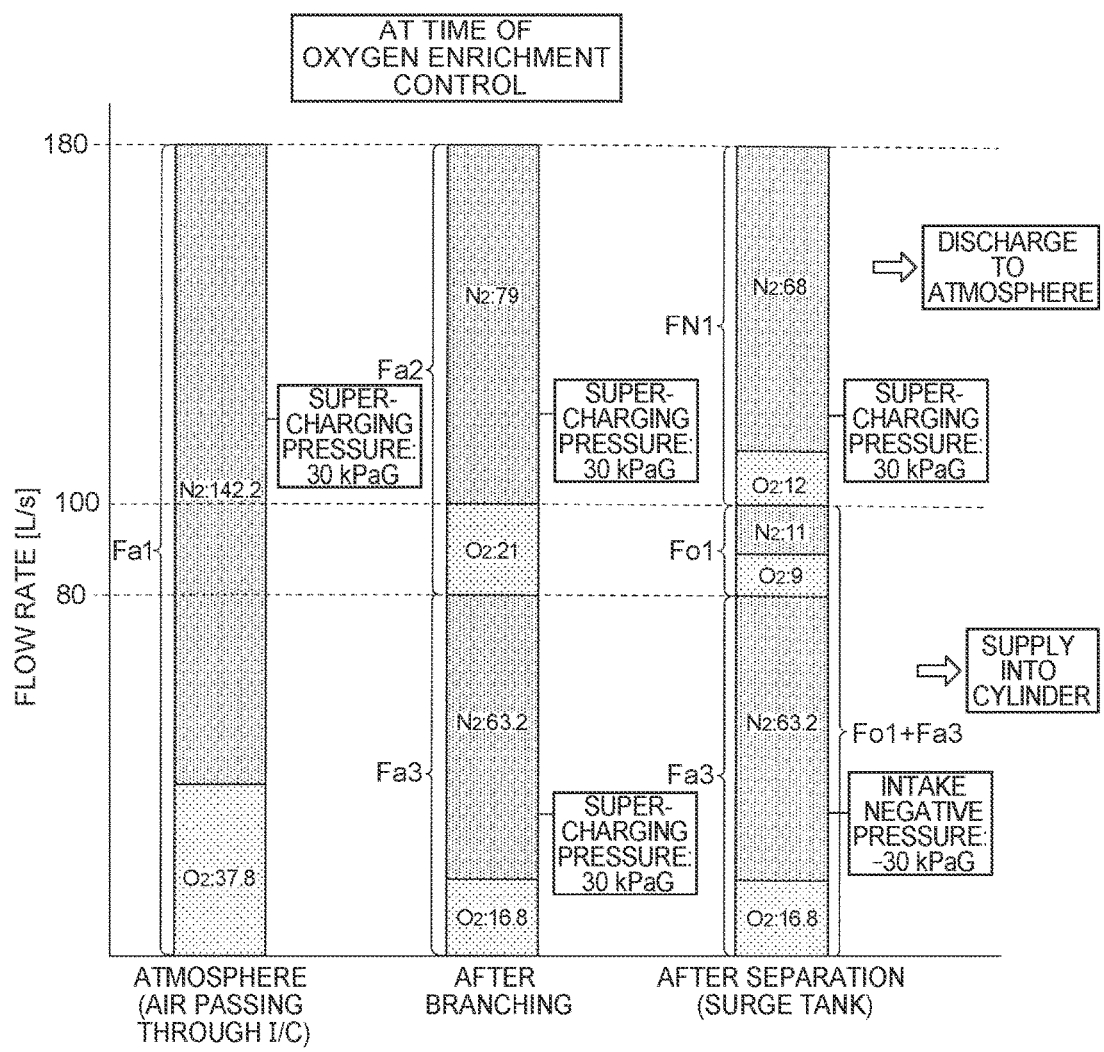
FIG. 8 is a graph showing compositions, flow rates, and pressures of intake air and the like at the time when the gas supply device according to the reference example (the related art) performs oxygen enrichment control.

In this case, FIG. 8 shows examples of flow rates and compositions of "gases Fa1 to Fa3, a gas FN1, and a gas Fo1" shown in FIG. 7 and prescribed below. (i) The gas Fa1 is a gas passing through the intercooler 46 (the air passing through the intercooler). (ii) The gas Fa2 is a gas branching off from the gas Fa1 and flowing into the oxygen enrichment membrane module 48 (the air passing through an oxygen separation portion). (iii) The gas Fa3 is a gas branching off from the gas Fa1 and passing through the air throttle valve 213a (the air passing through a third valve). (iv) The gas FN1 is nitrogen-enriched air obtained after separation of the gas Fa2 by the oxygen enrichment membrane module 48. (v) The gas Fo1 is oxygen-enriched air obtained after separation of the gas Fa2 by the oxygen enrichment membrane module 48. Incidentally, as described previously, the opening degree of the oxygen throttle valve 211a is a full-admission opening degree, and the opening degree of the nitrogen throttle valve 212a is a full-closure opening degree. Therefore, the gas supplied into each of the cylinders 22 is a gas (Fa3+Fo1) obtained by merging the gas Fa3 and the gas Fo1 (oxygen-enriched air) with each other.

In FIG. 8, the leftmost bar chart corresponds to the air passing through the intercooler, the central bar chart corresponds to the air obtained after separation of the air passing through the intercooler into the air moving toward the oxygen enrichment membrane module 48 and the air moving toward the air throttle valve 213a, and the rightmost bar chart corresponds to the gas supplied to each of the cylinders 22 (the air flowing into the surge tank 42) and the gas discharged to the atmosphere.

As is understood from FIG. 8, in the reference example, the flow rate of the air Fa1 passing through the intercooler is much higher than "the flow rate of oxygen-enriched air (Fo1+Fa3) as the gas supplied to each of the cylinders 22". At the same time, the flow rate of the air Fa1 passing through the intercooler is much higher than the flow rate of the gas FN1 discharged to the atmosphere. That is, when oxygen enrichment control is performed in the reference example, the flow rate of air passing through the air cleaner 44a, the intercooler 46 and the compressor 45a is very high. Accordingly, the air cleaner 44a, the intercooler 46 and the compressor 45a need to be enlarged in size.

Furthermore, in the reference example, only the compressor 45a of the turbocharger 45 is used to pressurize intake air (pressurization for generating a membrane differential pressure in the oxygen enrichment membrane 48b). Therefore, when the operating state of the internal combustion engine 200 according to the reference example is a state (a non-supercharging state) where the compressor 45a is substantially out of operation, the membrane differential pressure that is needed in separating the gas Fa2 by the oxygen enrichment membrane module 48 cannot be generated. Accordingly, when the operating state of the internal combustion engine 200 is the non-supercharging state, the atmosphere cannot be reformed into oxygen-enriched air.

Figure 9:
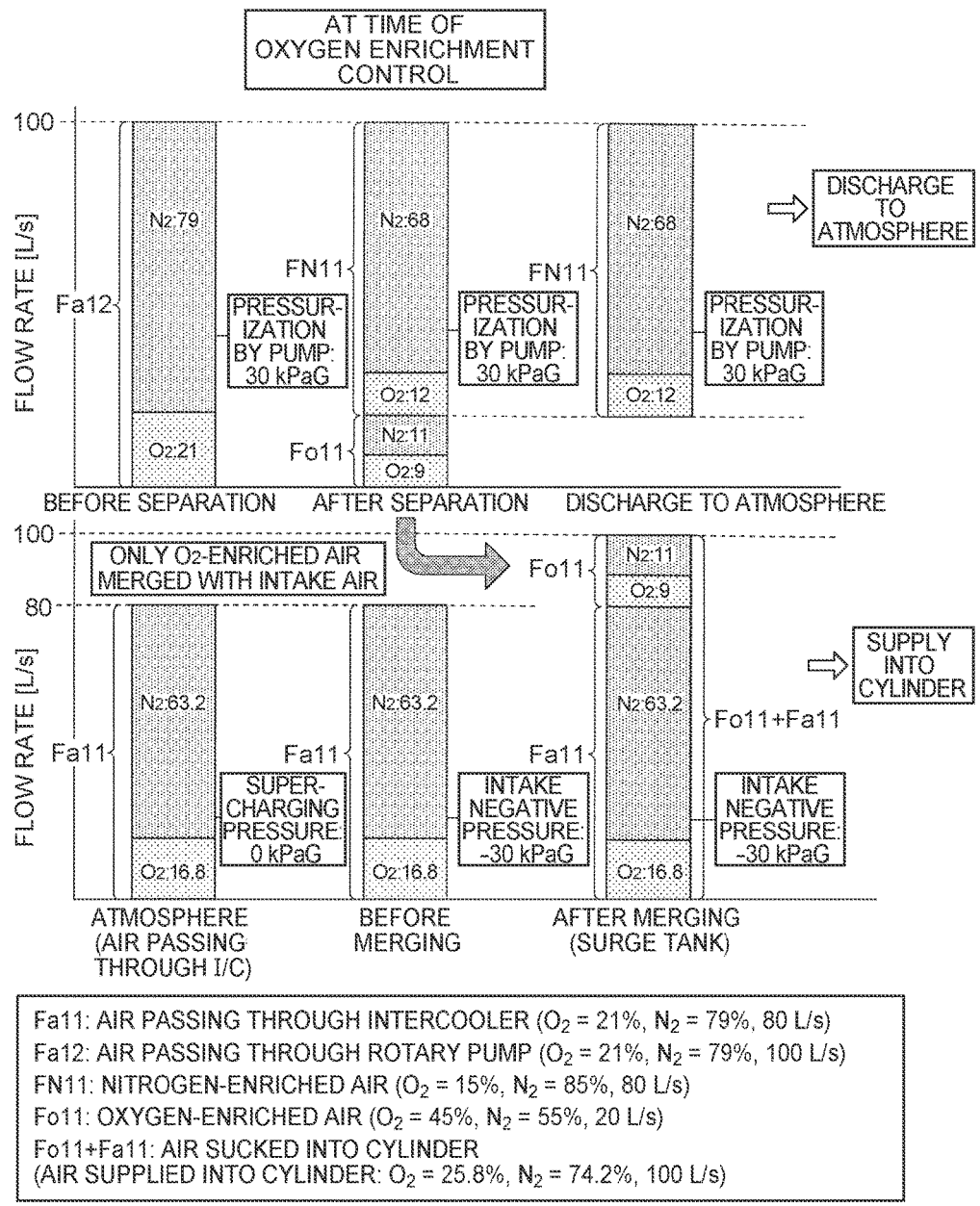
FIG. 9 is a graph showing compositions, flow rates, and pressures of intake air and the like at the time when the gas supply device for the internal combustion engine according to the first embodiment of the disclosure performs oxygen enrichment control.

In contrast, in the first gas supply device, FIG. 9 shows examples of flow rates and compositions of "gases Fa11 and Fa12, a gas FN11, and a gas Fo11" shown in FIG. 1 and prescribed below. (i) The gas Fa11 is the gas passing through the intercooler 46 (the air passing through the intercooler). (ii) The gas Fa12 is the gas passing through the rotary pump 62 (the air passing through the rotary pump). (iii) The gas FN11 is nitrogen-enriched air obtained after separation of the gas Fa12 by the oxygen enrichment membrane module 48. (iv) The gas Fo11 is oxygen-enriched air obtained after separation of the gas Fa12 by the oxygen enrichment membrane module 48. (v) The gas (Fa11+Fo11) obtained by merging the gas Fa11 and the gas Fo11 with each other is the gas supplied into each of the cylinders 22.

In FIG. 9, which is a graph showing the composition, flow rate, and pressure of intake air and the like when the gas supply device for the internal combustion engine according to the present first embodiment of the disclosure performs oxygen enrichment control, three bar charts in the upper stage correspond, sequentially from the left to the right, to the air passing through the rotary pump (i.e., the air that has not been separated into oxygen-enriched air and nitrogen-enriched air yet), the air that has been separated into oxygen-enriched air and nitrogen-enriched air, and the air discharged to the atmosphere, respectively. Furthermore, in FIG. 9, three bar charts in the lower stage correspond, sequentially from the left to the right, to the air passing through the intercooler, the air flowing into the oxygen enrichment membrane module 48, and the gas supplied to each of the cylinders 22 (the air flowing into the surge tank 42), respectively.

As is understood from FIG. 9, in the first gas supply device, the flow rate of the air Fa11 passing through the intercooler is lower than "the flow rate of oxygen-enriched air (Fa11+Fo11) as the gas supplied to each of the cylinders 22", in comparison with the foregoing reference example. That is, in the case where oxygen-enriched air is supplied to each of the cylinders 22 at 100 (L/s) according to the foregoing reference example, the atmosphere needs to be pressurized at 180 (L/s) by the compressor 45a. In contrast, in the case where oxygen-enriched air is supplied to each of the cylinders 22 at 100 (L/s) by the first gas supply device, the atmosphere may be pressurized only at 80 (L/s) by the compressor 45a. Accordingly, the first gas supply device can make the air cleaner 44a, the intercooler 46 and the compressor 45a smaller in size than in the foregoing reference example.

Furthermore, in performing oxygen enrichment control, the first gas supply device generates a membrane differential pressure of the oxygen enrichment membrane 48b that is needed in separating the gas Fa12 in the oxygen enrichment membrane module 48, by operating (positively rotating) the rotary pump 62. Accordingly, even when the operating state of the internal combustion engine 10 is the non-supercharging state, the atmosphere can be reformed into oxygen-enriched air.

Furthermore, in performing oxygen enrichment control, the first gas supply device sets the second throttle valve opening degree TA2 to "the second full-admission opening degree", and sets the first throttle valve opening degree TA1 to "a throttle valve opening degree TAim for making the pressure P2 coincide with the target intake pressure Pim2". Thus, the pressure in the intra-membrane space becomes negative. Accordingly, the membrane differential pressure Pd can be efficiently made high even when the pressure in the extra-membrane space (the pressure P5 of auxiliary air, namely, the target pump pressure Ppump) is not made very high. As a result, the air containing a high concentration of oxygen can be introduced into the intra-membrane space without making the energy consumed by the rotary pump 62 large. Thus, oxygen-enriched air can be produced with good energy efficiency.

Next, a contrast between nitrogen enrichment control according to the foregoing reference example and nitrogen enrichment control of the first gas supply device will be described. In performing nitrogen enrichment control, the ECU according to the foregoing reference example sets the throttle valve opening degree of the air throttle valve 213a to "the throttle valve opening degree at the time when the air throttle valve 213a is fully closed", sets the throttle valve opening degree of the oxygen throttle valve 211a to "the throttle valve opening degree at the time when the oxygen throttle valve 211a is fully closed", and sets the throttle valve opening degree of the nitrogen throttle valve 212a to "the predetermined throttle valve opening degree (e.g., the more or less intermediate throttle valve opening degree)".

Figure 10:
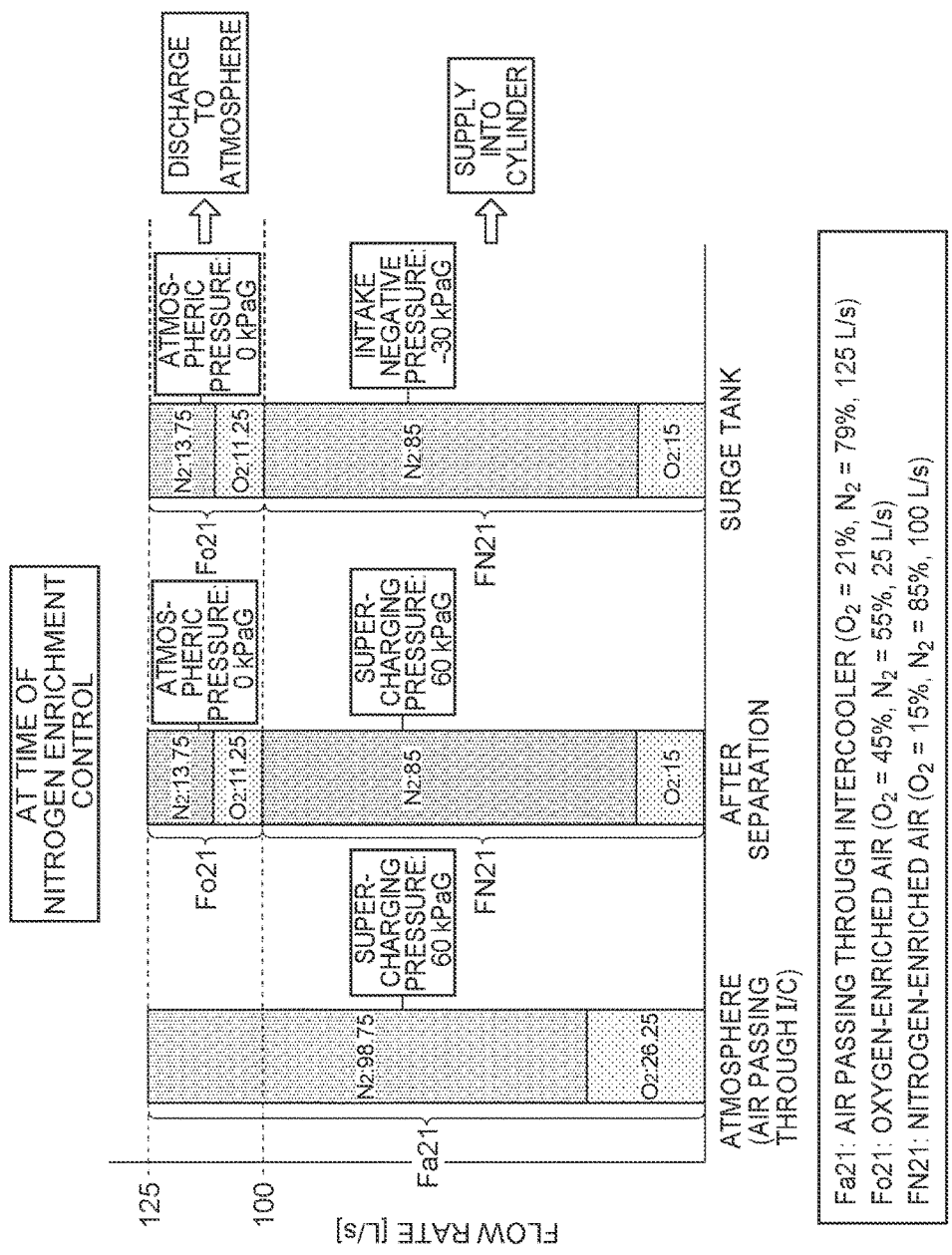
FIG. 10 is a graph showing compositions, flow rates, and pressures of intake air and the like at the time when the gas supply device for the internal combustion engine according to the reference example performs nitrogen enrichment control.

In this case, FIG. 10 shows examples of flow rates and compositions of "a gas Fa21, a gas Fo21, and a gas FN21" shown in FIG. 7 and prescribed below. (i) The gas Fa21 is the gas passing through the intercooler 46 (the air passing through the intercooler). (ii) The gas FN21 is nitrogen-enriched air obtained after separation of the gas Fa21 by the oxygen enrichment membrane module 48. (iii) The gas Fo21 is oxygen-enriched air obtained after separation of the gas Fa21 by the oxygen enrichment membrane module 48. Incidentally, as described previously, the opening degree of the oxygen throttle valve 211a is equal to the full-closure opening degree, and the opening degree of the air throttle valve 213a is also equal to the full-closure opening degree. Therefore, the gas supplied into each of the cylinders 22 is the gas FN21 (nitrogen-enriched air).

In FIG. 10, the leftmost bar chart corresponds to the air passing through the intercooler, the central bar chart corresponds to the air obtained after separation of the air passing through the intercooler into the air moving toward the oxygen enrichment membrane module 48 and the air moving toward the air throttle valve 213a, and the rightmost bar chart corresponds to the gas supplied to each of the cylinders 22 (the air flowing into the surge tank 42) and the gas discharged to the atmosphere.

Figure 11:
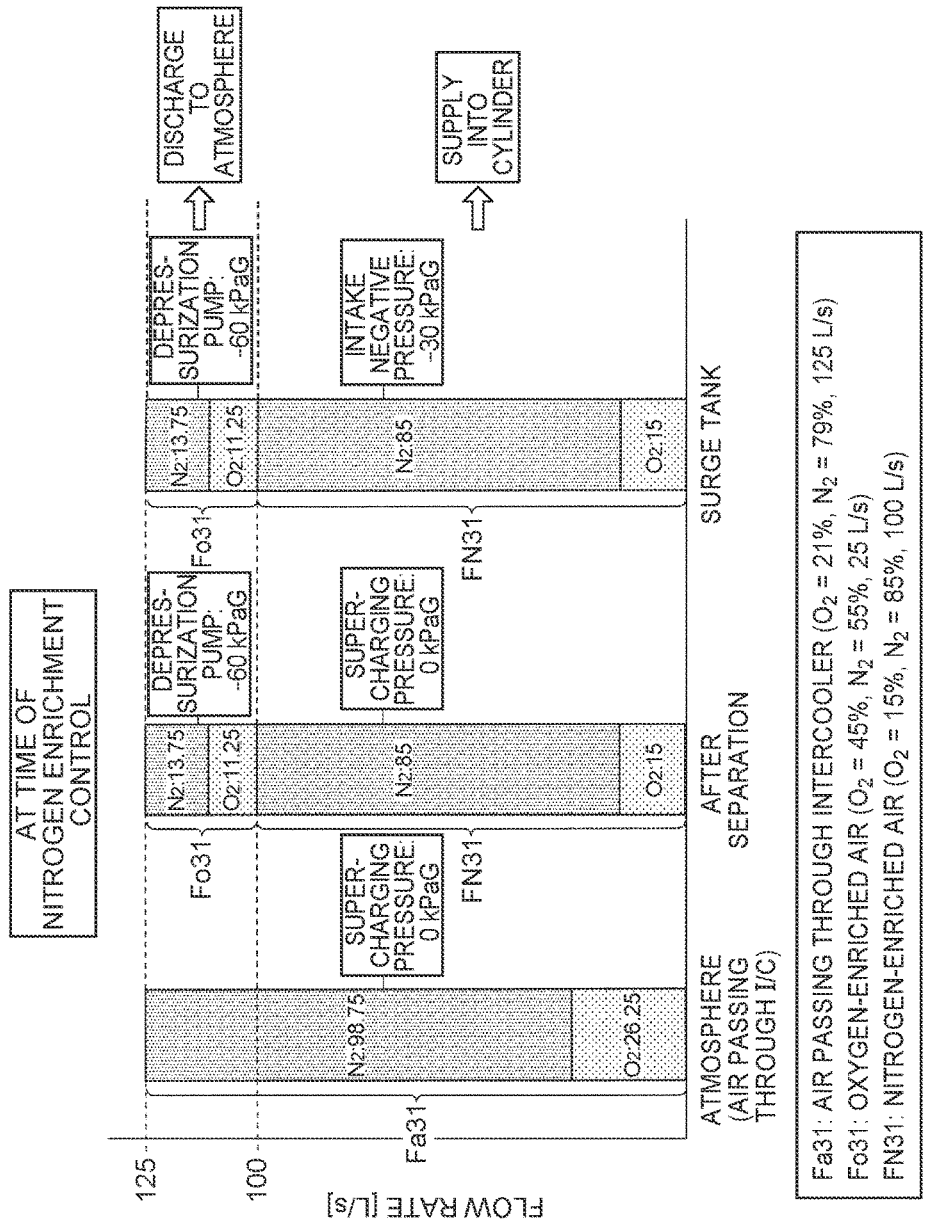
FIG. 11 is a graph showing compositions, flow rates, and pressures of intake air and the like at the time when the gas supply device for the internal combustion engine according to the first embodiment of the disclosure performs nitrogen enrichment control.

In contrast, in the first gas supply device, FIG. 11 shows examples of flow rates and compositions of "a gas Fa31, a gas Fo31, and a gas FN31" shown in FIG. 1 and prescribed below. (i) The gas Fa31 is the gas passing through the intercooler 46 (the air passing through the intercooler). (ii) The gas Fo31 is oxygen-enriched air obtained after separation of the gas Fa31 by the oxygen enrichment membrane module 48. (iii) The gas FN31 is nitrogen-enriched air obtained after separation of the gas Fa31 by the oxygen enrichment membrane module 48, and is the gas supplied to each of the cylinders 22.

In FIG. 11, the leftmost bar chart corresponds to the air passing through the intercooler, the central bar chart corresponds to the air obtained after separation of the air passing through the intercooler by the oxygen enrichment membrane module 48, and the rightmost bar chart corresponds to the gas supplied to each of the cylinders 22 (the air flowing into the surge tank 42) and the gas discharged to the atmosphere.

As is understood from a comparison between FIG. 10 and FIG. 11, there is no difference in the flow rate and composition of the gases between the reference example and the first gas supply device, when nitrogen enrichment control is performed.

In the foregoing reference example, however, only the compressor 45a of the turbocharger 45 is used to pressurize intake air (pressurization for generating the membrane differential pressure of the oxygen enrichment membrane 48b). Therefore, when the operating state of the internal combustion engine 200 is the non-supercharging state, the membrane differential pressure that is needed in separating the gas Fa21 by the oxygen enrichment membrane module 48 cannot be generated. Accordingly, when the operating state of the internal combustion engine 200 is the non-supercharging state, the atmosphere cannot be reformed into nitrogen-enriched air.

In contrast, in performing nitrogen enrichment control, the first gas supply device generates the membrane differential pressure of the oxygen enrichment membrane 48b that is needed in separating the gas Fa31 by the oxygen enrichment membrane module 48, by operating (reversely rotating) the rotary pump 62. Accordingly, even when the operating state of the internal combustion engine 10 is the non-supercharging state, the atmosphere can be reformed into nitrogen-enriched air.

Furthermore, in performing nitrogen enrichment control, the first gas supply device sets the first throttle valve opening degree TA1 to "the first full-admission opening degree", and sets the second throttle valve opening degree TA2 to "the throttle valve opening degree TAim for making the pressure P4 coincide with the target intake pressure Pim4". Accordingly, the pressure in the intra-membrane space is equal to the atmospheric pressure, or higher than the atmospheric pressure when supercharging is carried out. In consequence, the membrane differential pressure Pd can be efficiently made high even when the pressure in the extra-membrane space (the pressure of auxiliary air P5, namely, the target pump pressure Ppump) is not made very low. As a result, the air containing a high concentration of nitrogen (nitrogen-enriched air) can be produced in the intra-membrane space with good energy efficiency, without making the energy consumed by the rotary pump 62 large.

Figure 12:
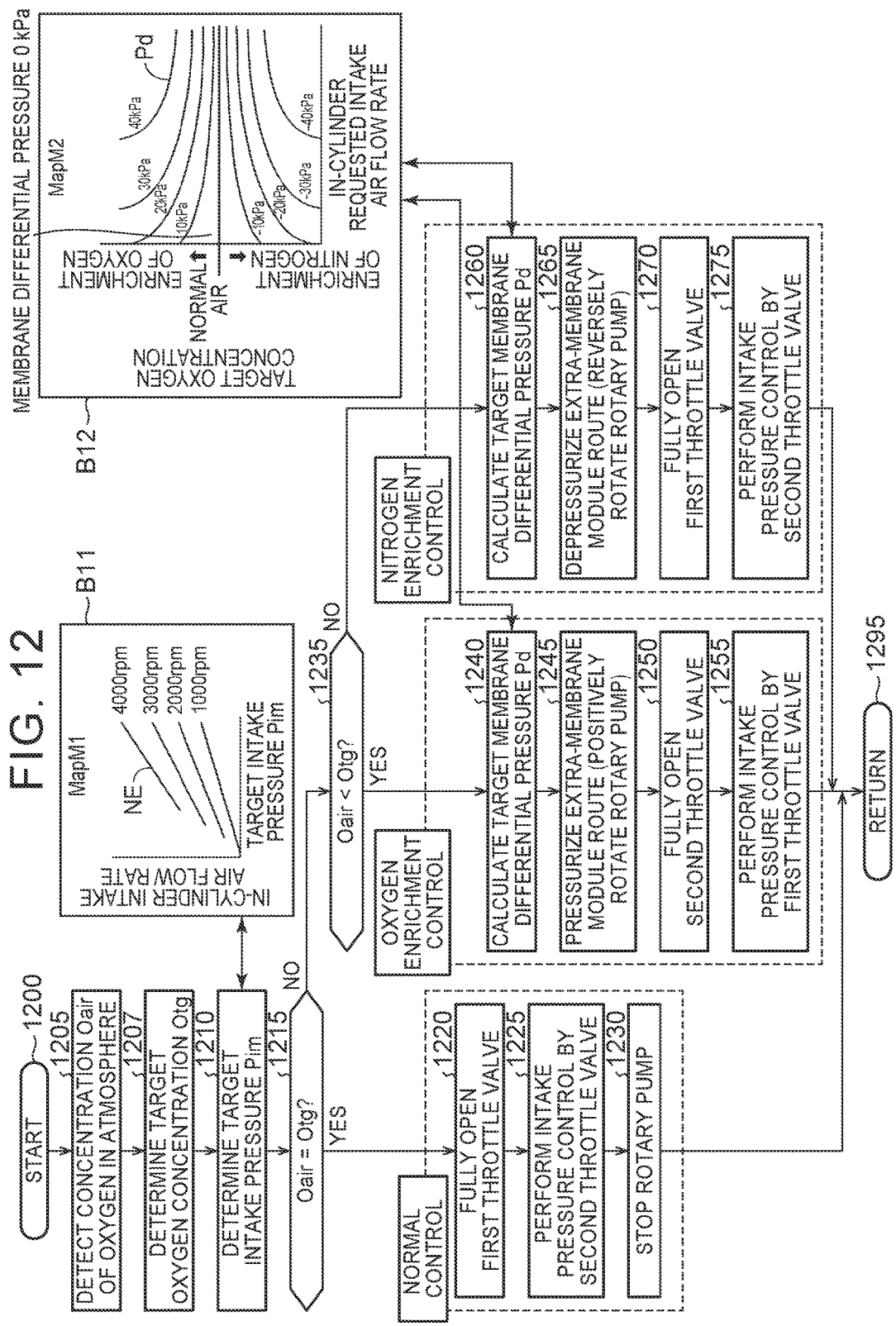
FIG. 12 is a flowchart showing a routine that is executed by a CPU of an ECU of the gas supply device for the internal combustion engine according to the first embodiment of the disclosure.

Next, the concrete operation performed by the first gas supply device will be described. The CPU of the ECU 70 (hereinafter referred to simply as "the CPU") executes a routine indicated by a flowchart of FIG. 12, at intervals of a predetermined time.

The CPU starts a process in step 1200 at a predetermined timing, sequentially carries out processes in steps 1205 to 1210 that will be described below, and then proceeds to step 1215.

In step 1205, the CPU acquires a concentration of oxygen (the detected oxygen concentration Oair) in air (fresh air or the atmosphere) detected by the oxygen concentration sensor 76.

In step 1207, the CPU determines the target oxygen concentration Otg from the operating state of the internal combustion engine 10. In concrete terms, if cold start of the engine has just ended (when the cooling liquid temperature THW is lower than a liquid temperature THWth), the CPU sets the target oxygen concentration Otg to "an oxygen concentration (a high oxygen concentration) selected from a range higher than 21% and equal to or lower than 26%" with a view to warming up a catalyst at an early stage. If the engine has been warmed up (when the cooling liquid temperature THW is equal to or higher than the liquid temperature THWth), the CPU sets the target oxygen concentration Otg to "an oxygen concentration (a low oxygen concentration) selected from a range equal to or higher than 16% and lower than 21%" with a view to improving fuel economy. Incidentally, the concentration of oxygen in the atmosphere is equal to 21%.

In step 1210, the CPU determines the target intake pressure Pim by applying the engine rotational speed NE and the in-cylinder requested intake air flow rate to a look-up table (referred to also as "a map") M1 indicated by a block B11. Incidentally, the CPU separately calculates the in-cylinder requested intake air flow rate by applying the engine rotational speed NE acquired from the engine rotational speed sensor 77 and the accelerator pedal operation amount AP acquired from the accelerator pedal operation amount sensor 79 to a look-up table (not shown).

Upon proceeding to step 1215, the CPU determines whether or not the detected oxygen concentration Oair and the target oxygen concentration Otg are equal to each other.

If the detected oxygen concentration Oair and the target oxygen concentration Otg are equal to each other, the CPU determines that the result of step 1215 is "Yes", sequentially carries out processes of steps 1220 to 1230 that will be described below, and then proceeds to step 1295 to temporarily end the present routine. Thus, the foregoing normal control is performed.

In step 1220, the CPU sends a signal to the first throttle valve actuator 47b, and sets the first throttle valve opening degree TA1 to the first full-admission opening degree. In step 1225, the CPU sets the second throttle valve opening degree TA2 to the throttle valve opening degree TAim corresponding to the target intake pressure Pim determined in step 1210. That is, the CPU sends a signal to the second throttle valve actuator 49b, and controls the second throttle valve opening degree TA2 such that the pressure P4 of intake air detected by the intake pipe pressure sensor 75d coincides with the target intake pressure Pim4 (=Pim). In step 1230, the CPU stops the rotary pump 62. Incidentally, if the rotary pump 62 is stopped at the time point of this process, the CPU holds the rotary pump 62 stopped. Incidentally, when the CPU performs normal control, the pressure applied to the check valve 63 is lower than the predetermined valve-opening pressure, so the check valve is closed.

In contrast, if the detected oxygen concentration Oair and the target oxygen concentration Otg are different from each other, the CPU determines that the result of step 1215 is "No", and proceeds to step 1235 to determine whether or not the detected oxygen concentration Oair is lower than the target oxygen concentration Otg.

If the detected oxygen concentration Oair is lower than the target oxygen concentration Otg, the CPU determines that the result of step 1235 is "Yes", sequentially carries out processes in steps 1240 to 1255 that will be described below, and then proceeds to step 1295 to temporarily end the present routine. Thus, the foregoing oxygen enrichment control is performed.

In step 1240, the CPU determines the target membrane differential pressure Pd by applying the target oxygen concentration Otg and the separately calculated in-cylinder requested intake air flow rate to a look-up table M2 indicated by a block B12.

In step 1245, the CPU operates (positively rotates) the rotary pump 62 such that the pressure P4 of auxiliary air pressurized by the rotary pump 62 (the pressure detected by the auxiliary conduit pressure sensor 75e) coincides with a pressure (Pim+Pd) obtained by summating the target intake pressure Pim and the target membrane differential pressure Pd.

In step 1250, the CPU sends a signal to the second throttle valve actuator 49b, and sets the second throttle valve opening degree TA2 to the second full-admission opening degree.

In step 1255, the CPU sends a signal to the first throttle valve actuator 47b, and sets the first throttle valve opening degree TA1 to "the throttle valve opening degree TAim corresponding to the target intake pressure Pim determined in step 1210". That is, the CPU controls the first throttle valve opening degree TA1 such that the pressure P2 of intake air detected by the intake pipe pressure sensor 75b coincides with the target intake pressure Pim2 (=Pim).

Incidentally, if the pressure in the extra-membrane space is higher than the predetermined valve-opening pressure of the check valve 63 when oxygen enrichment control is performed, the check valve 63 is open. If the pressure in the extra-membrane space is equal to or lower than the predetermined valve-opening pressure of the check valve 63, the check valve 63 is closed.

In contrast, if the detected oxygen concentration Oair is equal to or higher than the target oxygen concentration Otg, the CPU determines that the result of step 1235 is "No", sequentially carries out processes in steps 1260 to 1275 that will be described later, and then proceeds to step 1295 to temporarily end the present routine. Thus, the foregoing nitrogen enrichment control is performed.

In step 1260, the CPU determines the target membrane differential pressure Pd by applying the target oxygen concentration Otg and the separately calculated in-cylinder requested intake air flow rate to the look-up table M2 indicated by the block B12.

In step 1265, the CPU operates (reversely rotates) the rotary pump 62 such that the pressure P4 of auxiliary air depressurized by the rotary pump 62 coincides with a pressure (P1+Pd) obtained by summating the pressure P1 immediately behind the intercooler 46 detected by the intake pipe pressure sensor 75a and the target membrane differential pressure Pd.

In step 1270, the CPU sends a signal to the first throttle valve actuator 47b, and sets the first throttle valve opening degree TA1 to the first full-admission opening degree.

In step 1275, the CPU sends a signal to the second throttle valve actuator 49b, and sets the second throttle valve opening degree TA2 to the throttle valve opening degree TAim corresponding to the target intake pressure Pim determined in step 1210. That is, the CPU controls the second throttle valve opening degree TA2 such that the pressure P4 of intake air detected by the intake pipe pressure sensor 75d coincides with the target intake pressure Pim4 (=Pim). Incidentally, when nitrogen enrichment control is performed, the pressure applied to the check valve 63 is lower than the predetermined valve-opening pressure, so the check valve 63 is closed.

According to the first gas supply device, an effect that will be described below can be obtained. That is, the first gas supply device generates the membrane differential pressure of the oxygen enrichment membrane 48b that is needed in separating gas by the oxygen enrichment membrane module 48, through the use of the rotary pump 62, in performing oxygen enrichment control or nitrogen enrichment control. Accordingly, even when the operating state of the internal combustion engine 10 is the non-supercharging state, the air can be reformed into oxygen-enriched air or nitrogen-enriched air.

Next, a gas supply device according to the second embodiment of the disclosure (hereinafter referred to as "a second gas supply device" in some cases) will be described. This second gas supply device is different from the first gas supply device only in the following respect.

Figure 13:
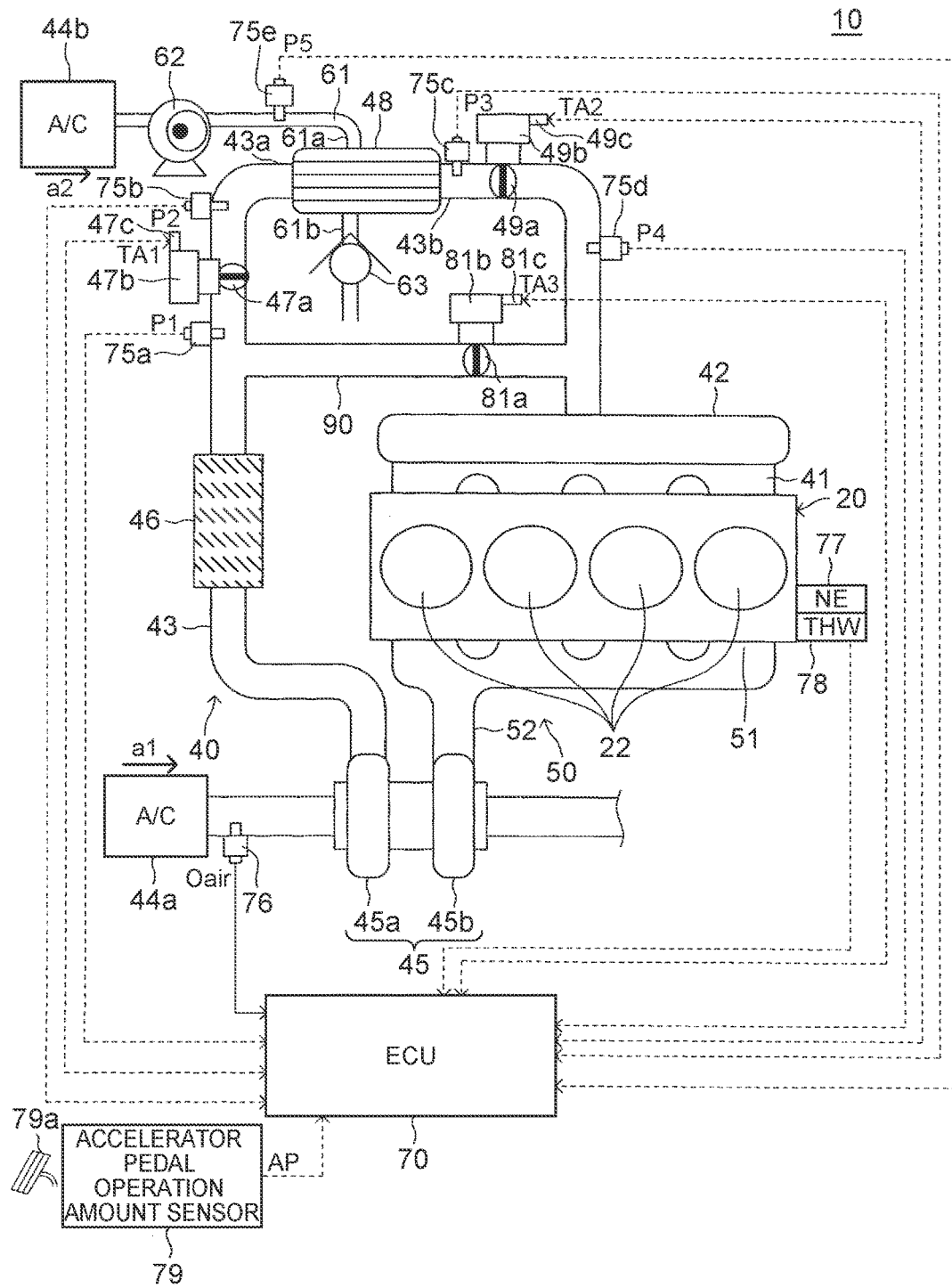
FIG. 13 is an outline view of an internal combustion engine to which a gas supply device for an internal combustion engine according to the second embodiment of the disclosure is applied.

As shown in FIG. 13, the second gas supply device is obtained by additionally providing the first gas supply device with a normal air intake pipe 90, and a third throttle valve 81a and third throttle valve actuator 81b that are disposed in the normal air intake pipe 90. The normal air intake pipe 90 constitutes an air passage through which intake air passes, between the intercooler 46 and a region downstream of the first throttle valve 47a, and establishes communication between a region downstream of the second throttle valve 49a and a region upstream of the surge tank 42.

The third throttle valve actuator 81b includes a third throttle opening degree sensor 81c for detecting a third throttle valve opening degree. The third throttle opening degree sensor 81c detects the third throttle valve opening degree of the third throttle valve 81a, and outputs a signal representing a third throttle valve opening degree TA3 to the ECU 70. Incidentally, the normal air intake pipe 90 will be referred to also as "a fifth pipe portion" for the sake of convenience, and the air passage thereof will be referred to also as "a fifth air passage". The third throttle valve 81a will be referred to also as "a third valve" for the sake of convenience, and the throttle valve opening degree thereof will be referred to also as "a third valve opening degree".

When there is a request to supply normal air into each of the cylinders 22 (i.e., when normal control is performed), the second gas supply device sets the throttle valve opening degrees of the first throttle valve 47a, the second throttle valve 49a, and the third throttle valve 81a as will be described below. Thus, the second gas supply device supplies the intake air that has passed through the intercooler 46 into each of the cylinders 22 through the normal air intake pipe 90, without the intermediary of the oxygen enrichment membrane module 48.

The first throttle valve opening degree TA1 of the first throttle valve 47a is a throttle valve opening degree at the time when the first throttle valve 47a is fully closed.

The second throttle valve opening degree TA2 of the second throttle valve 49a is a throttle valve opening degree at the time when the second throttle valve 49a is fully closed.

The third throttle valve opening degree TA3 of the third throttle valve 81a is the throttle valve opening degree TAim corresponding to the target intake pressure Pim (i.e., the throttle valve opening degree for making the pressure P4 coincide with the target intake pressure Pim4 (=Pim)).

Incidentally, the second gas supply device is the same as the first gas supply device except that the third throttle valve opening degree of the third throttle valve 81a is set to the throttle valve opening degree at the time when the third throttle valve 81a is fully closed, in performing oxygen enrichment control and nitrogen enrichment control.

As is the case with the first gas supply device, the second gas supply device thus configured can reform air into oxygen-enriched air or nitrogen-enriched air and can efficiently reform air into oxygen-enriched air or nitrogen-enriched air, even when the operating state of the internal combustion engine 10 is the non-supercharging state.

Furthermore, in performing normal control, the second gas supply device can supply the intake air that has passed through the intercooler 46 into each of the cylinders 22, without the intermediary of the oxygen enrichment membrane module 48. Accordingly, the second gas supply device can prevent the occurrence of pressure loss at the time of passage through the oxygen enrichment membrane module 48, in performing normal control.

Figure 14:
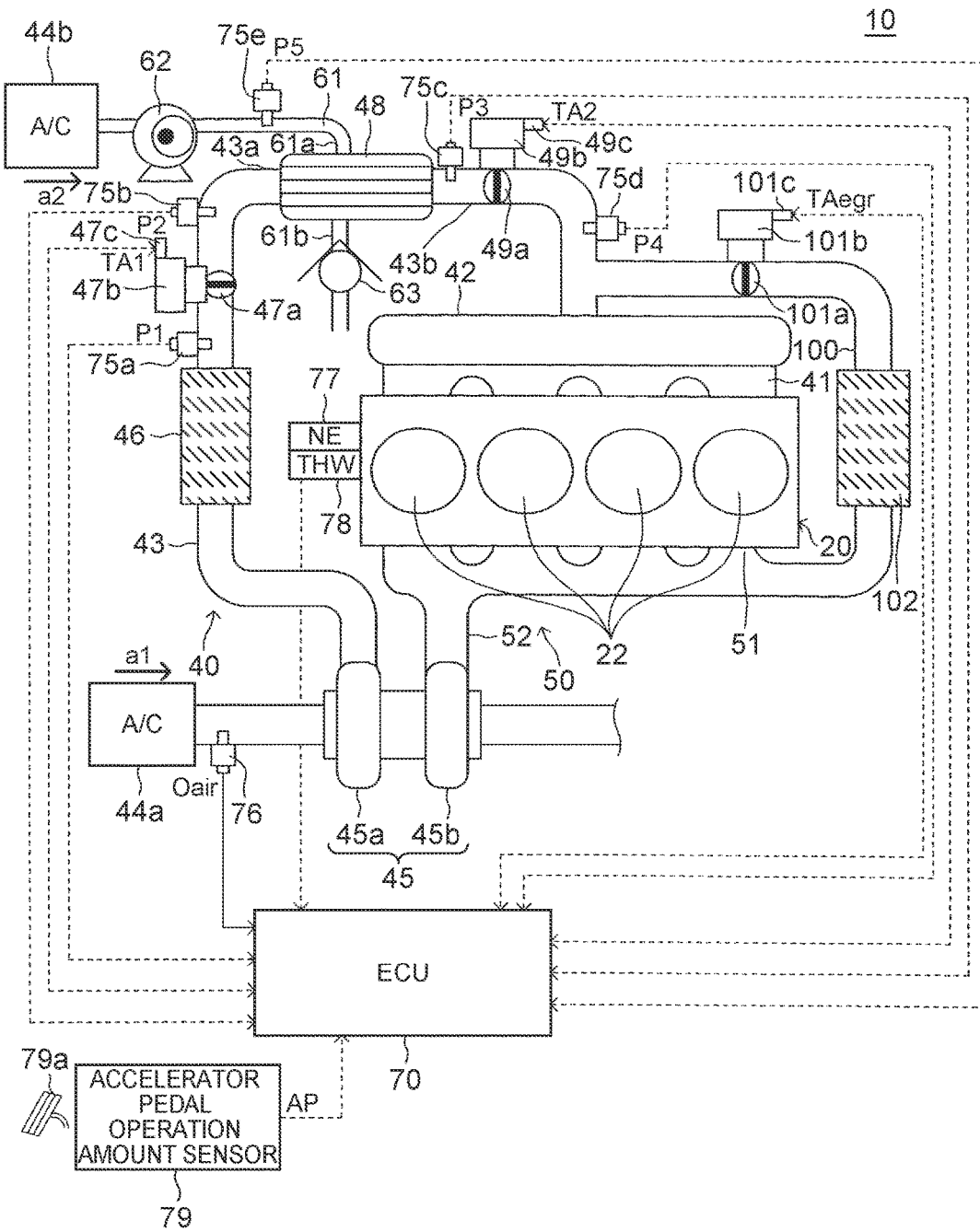
FIG. 14 is an outline view of an internal combustion engine to which a gas supply device for an internal combustion engine according to the third embodiment of the disclosure is applied.

Next, a gas supply device according to the third embodiment of the disclosure (hereinafter referred to as "a third gas supply device" in some cases) will be described. This third gas supply device is different from the first gas supply device only in the following respect. Incidentally, the characteristics of the third gas supply device can also be applied to the second gas supply device. As shown in FIG. 14, the third gas supply device is obtained by additionally providing the first gas supply device with an exhaust gas recirculation pipe (an EGR pipe) 100, an EGR valve 101a, an EGR valve actuator 101b, and an EGR cooler (an EGR gas cooling device) 102.

The exhaust gas recirculation pipe 100 constitutes an EGR gas passage through which EGR gas flows. One end of the exhaust gas recirculation pipe 100 communicates with the second air passage between a region downstream of the second throttle valve 49a and a region upstream of the surge tank 42. The other end of the exhaust gas recirculation pipe 100 communicates with the exhaust manifold 51 of the exhaust passage.

The EGR valve actuator 101b includes an EGR valve opening degree sensor 101c. The EGR valve opening degree sensor 101c is connected to the ECU 70, detects an EGR valve opening degree of the EGR valve 101a, and outputs a signal representing an EGR valve opening degree TAegr. The EGR valve 101a is disposed in the exhaust gas recirculation pipe 100. The EGR valve 101a adjusts the amount of EGR gas flowing through the exhaust gas recirculation pipe 100, in response to a command of the ECU 70.

The EGR cooler 102 is disposed in the exhaust gas recirculation pipe 100 at a position upstream of the EGR valve 101a in a flow direction of EGR gas. The EGR cooler 102 lowers the temperature of EGR gas. The EGR valve 101a adjusts the amount of EGR gas passing through the EGR gas passage, by making the opening cross-sectional area of the EGR gas passage variable. The EGR valve actuator 91b changes the EGR valve opening degree TAegr of the EGR valve 101a in accordance with the command of the ECU 70. The third gas supply device opens the EGR valve 101a and supplies EGR gas to the intake pipe 43, in performing each of nitrogen enrichment control and oxygen enrichment control.

As is the case with the first gas supply device, the third gas supply device thus configured can reform intake air into oxygen-enriched air or nitrogen-enriched air and can efficiently reform intake air into oxygen-enriched air or nitrogen-enriched air, even when the operating state of the internal combustion engine 10 is in a non-supercharging range.

Furthermore, the third gas supply device can supply EGR gas into each of the cylinders 22 (each of the combustion chambers) in performing nitrogen enrichment control. Accordingly, the third gas supply device can further lower the concentration of oxygen in the gas supplied to each of the cylinders 22 during nitrogen enrichment control. As a result, the third gas supply device can improve fuel economy and reduce the amount of NOx. Furthermore, the third gas supply device can also supply EGR gas into each of the combustion chambers of the cylinders 22 in performing oxygen enrichment control. In this case, the nitrogen contained in the gas supplied to each of the cylinders 22 is replaced with EGR gas. In consequence, the specific heat of intake air rises, and the temperature of combustion can be lowered, so the amount of NOx can be reduced.

Although the respective embodiments of the disclosure have been described above concretely, the disclosure is not limited to the above-mentioned respective embodiments thereof, but can be modified in various manners based on the technical concept thereof.

For example, each of the first to third gas supply devices may employ a diaphragm pump or a piston pump instead of the rotary pump 62. Each of the first to third gas supply devices may employ a throttle valve instead of the check valve and control the throttle valve opening degree of the throttle valve such that the throttle valve performs the same operation as the check valve.

For example, when a changeover between pressurization and depressurization cannot be made by positively or reversely rotating the rotary pump, each of the first to third gas supply devices may change over piping connection and the valves or include two or more rotary pumps installed therein.

For example, in each of the first to third gas supply devices, the oxygen enrichment membrane module is not absolutely required to use a hollow fiber-like oxygen enrichment membrane, as long as air can be separated into oxygen-enriched air and nitrogen-enriched air. That is, various oxygen enrichment membrane modules can be employed. For example, the oxygen enrichment membrane module employed in each of the first to third gas supply devices may include a module structure such as a flat membrane laminated-type structure, a honeycomb monolith-type structure or the like.

What is claimed is:

1. A gas supply device for an internal combustion engine, the gas supply device comprising:
    an oxygen enrichment membrane module that includes a housing and an oxygen enrichment membrane, a space in the housing being separated into a first space and a second space by the oxygen enrichment membrane;
    a first pipe portion that constitutes a first air passage including one end from which an atmosphere can flow into the one end and the other end which communicates with the first space;
    a second pipe portion that constitutes a second air passage including one end which communicates with the first space and the other end which communicates with a combustion chamber of the internal combustion engine;
    a pump portion that is configured to raise a pressure in the second space by supplying a high-pressure atmosphere to the second space, and that is configured to lower the pressure in the second space by discharging air in the second space to an outside of the housing from the second space; and
    an electronic control unit that is configured to:
    (i) control a drive state of the pump portion, (ii) supply air to the first space from the second space through the oxygen enrichment membrane, by supplying the high-pressure atmosphere to the second space by driving the pump portion such that the pressure in the second space rises, a concentration of oxygen of the air being higher than a concentration of oxygen of the atmosphere, (iii) perform oxygen enrichment control that merges the air supplied to the first space with the atmosphere that has flowed into the first space through the first air passage, and supplies the merged air and atmosphere to the combustion chamber through the second air passage, the concentration of oxygen of the air being higher than the concentration of oxygen of the atmosphere, and (iv) perform nitrogen enrichment control that discharges air to the second space from the first space through the oxygen enrichment membrane, a concentration of oxygen of the air being higher than a concentration of oxygen of the atmosphere, produces air in the first space, a concentration of nitrogen of the air being higher than a concentration of nitrogen of the atmosphere, and supplies the air containing the higher concentration of nitrogen to the combustion chamber through the second air passage, by discharging the air in the second space to the outside of the housing from the second space by driving the pump portion such that the pressure in the second space falls.

2. The gas supply device for the internal combustion engine according to claim 1, wherein the housing includes a first communication hole and a second communication hole, the first communication hole connecting the first space to the other end of the first air passage, the second communication hole connecting the first space to the one end of the second air passage, and the first communication hole and the second communication hole being provided at positions that are opposed to each other, the first pipe portion is connected to the housing such that the other end of the first air passage communicates with the first communication hole, and the second pipe portion is connected to the housing such that the one end of the second air passage communicates with the second communication hole.

3. The gas supply device for the internal combustion engine according to claim 2, the gas supply device further comprising:

a check valve that is configured to discharge the air in the second space to the outside of the housing by opening when the pressure in the second space becomes equal to or higher than a predetermined valve-opening pressure.

4. The gas supply device for the internal combustion engine according to claim 3, the gas supply device further comprising:

a third pipe portion that constitutes a third air passage, one end of the third air passage being connected to the pump portion; and a fourth pipe portion that constitutes a fourth air passage that is opened and closed by the check valve, wherein the housing is equipped with a third communication hole that establishes communication between the second space and the third air passage, and a fourth communication hole that establishes communication between the second space and the fourth air passage, the third communication hole and the fourth communication hole being provided at positions that are opposed to each other, the third pipe portion is connected to the housing such that the other end of the third air passage communicates with the third communication hole, and the fourth pipe portion is connected to the housing such that the fourth air passage communicates with the fourth communication hole.

5. The gas supply device for the internal combustion engine according to claim 4, wherein the oxygen enrichment membrane assumes a shape of a hollow tube with both end surfaces of the hollow tube open, and is disposed in such a manner as to connect the first communication hole and the second communication hole to each other, a space inside the oxygen enrichment membrane constitutes the first space, a space other than the first space in the housing constitutes the second space, and the housing is provided with the first communication hole, the second communication hole, the third communication hole, and the fourth communication hole such that a direction in which the third communication hole and the fourth communication hole are linked with each other becomes parallel to a surface perpendicular to a direction in which the first communication hole and the second communication hole are linked with each other.

6. The gas supply device for the internal combustion engine according to claim 1, the gas supply device further comprising:

a compressor of a supercharger of the internal combustion engine that is disposed in the first pipe portion;

a first throttle valve that is disposed in the first pipe portion between the compressor and the oxygen enrichment membrane module and that is configured to change a passage cross-sectional area of the first air passage through a change in opening degree of the first throttle valve; and a second throttle valve that is disposed in the second pipe portion between the oxygen enrichment membrane module and the combustion chamber of the internal combustion engine and that is configured to change a passage cross-sectional area of the second air passage through a change in opening degree of the second throttle valve, wherein the electronic control unit is configured to: in performing the oxygen enrichment control, (i) change the opening degree of the first throttle valve in accordance with an in-cylinder requested intake air flow rate as a flow rate of air requested of the combustion chamber of the internal combustion engine, and (ii) set the opening degree of the second throttle valve to an opening degree at a time when the second throttle valve is fully open, and the electronic control unit is configured to: in performing the nitrogen enrichment control, (i) set the opening degree of the first throttle valve to an opening degree at a time when the first throttle valve is fully open, and (ii) change the opening degree of the second throttle valve in accordance with the in-cylinder requested intake air flow rate.

7. The gas supply device for the internal combustion engine according to claim 6, wherein the electronic control unit is configured to:

(i) stop driving the pump portion, (ii) set the opening degree of the first throttle valve to the opening degree at the time when the first throttle valve is fully open, (iii) change the opening degree of the second throttle valve in accordance with the in-cylinder requested intake air flow rate, and (iv) perform normal control for supplying the air flowing into the first space from the first air passage to the combustion chamber through the second air passage, without reforming the air.

8. The gas supply device for the internal combustion engine according to claim 7, the gas supply device further comprising:

a fifth pipe portion that constitutes a fifth air passage including one end that communicates with a location between the compressor in the first air passage and the first throttle valve and the other end that communicates with a location between the second throttle valve in the second air passage and the communication chamber; and a third throttle valve that is disposed in the fifth pipe portion and that changes a passage cross-sectional area of the fifth air passage through a change in opening degree of the third throttle valve, wherein the electronic control unit is configured to set the opening degree of the third throttle valve to an opening degree at a time when the third throttle valve is fully closed, in performing the oxygen enrichment control or the nitrogen enrichment control, and the electronic control unit is configured to change the opening degree of the third throttle valve in accordance with the in-cylinder requested intake air flow rate, in performing the normal control.

9. A control method for a gas supply device for an internal combustion engine, the gas supply device including:

an oxygen enrichment membrane module that includes a housing and an oxygen enrichment membrane, a space in the housing being separated into a first space and a second space by the oxygen enrichment membrane, a first pipe portion that constitutes a first air passage including one end from which an atmosphere can flow into the one end and the other end which communicates with the first space, a second pipe portion that constitutes a second air passage including one end which communicates with the first space and the other end which communicates with a combustion chamber of the internal combustion engine, and a pump portion that is configured to raise a pressure in the second space by supplying a high-pressure atmosphere to the second space, and that is configured to lower the pressure in the second space by discharging air in the second space to an outside of the housing from the second space, the control method comprising:

(i) controlling a drive state of the pump portion;

(ii) supplying air to the first space from the second space through the oxygen enrichment membrane, by supplying the high-pressure atmosphere to the second space by driving the pump portion such that the pressure in the second space rises, a concentration of oxygen of the air being higher than a concentration of oxygen of the atmosphere;

(iii) performing oxygen enrichment control that merges the air supplied to the first space with the atmosphere that has flowed into the first space through the first air passage, and supplies the merged air and atmosphere to the combustion chamber through the second air passage, the concentration of oxygen of the air being higher than the concentration of oxygen of the atmosphere; and (iv) performing nitrogen enrichment control that discharges air to the second space from the first space through the oxygen enrichment membrane, a concentration of oxygen of the air being higher than a concentration of oxygen of the atmosphere, produces air in the first space, a concentration of nitrogen of the air being higher than a concentration of nitrogen of the atmosphere, and supplies the air containing the higher concentration of nitrogen to the combustion chamber through the second air passage, by discharging the air in the second space to the outside of the housing from the second space by driving the pump portion such that the pressure in the second space falls.

* * * * *